United States Patent
Myers et al.

[11] Patent Number: 6,056,496
[45] Date of Patent: May 2, 2000

[54] CART LOADER AND METHOD OF LOADING

[75] Inventors: Hugh I. Myers, Woodbury; Mark H. Sickman, Rochester; William C. Tigner; Mark R. Rosa, both of Inver Grove Heights, all of Minn.

[73] Assignee: Cannon Equipment Company, Rosemount, Minn.

[21] Appl. No.: 08/880,036

[22] Filed: Jun. 20, 1997

Related U.S. Application Data

[60] Provisional application No. 60/020,167, Jun. 21, 1996.

[51] Int. Cl.⁷ .................................................. B65G 67/00
[52] U.S. Cl. ........................ 414/398; 414/401; 414/789.7
[58] Field of Search ..................................... 414/398–401, 414/791.6, 792.6, 792.7, 792.8, 793.4, 793.8, 794.3, 794.7, 789.7, 790.5, 790.6; 198/427, 429, 419.1

[56] References Cited

U.S. PATENT DOCUMENTS

| | | | |
|---|---|---|---|
| Re. 35,555 | 7/1997 | Sjogren et al. | 414/400 X |
| 1,811,593 | 6/1931 | Peterson | 414/790.9 |
| 2,675,028 | 4/1954 | Slater | 139/191 |
| 2,796,179 | 6/1957 | VanVleck | 414/792.6 |
| 2,813,638 | 11/1957 | Miller, Jr. | 414/793.4 X |
| 3,113,771 | 12/1963 | Tucci | 414/794.4 X |
| 3,136,950 | 6/1964 | Mackey | 375/301 |
| 3,294,257 | 12/1966 | Davies et al. | 414/792 |
| 3,379,320 | 4/1968 | Loach et al. | 414/788.3 |
| 3,414,138 | 12/1968 | Junemann et al. | 414/793.8 |
| 3,456,815 | 7/1969 | Carpels | 414/793.8 |
| 3,491,901 | 1/1970 | Pearne et al. | 414/792.6 X |
| 3,545,630 | 12/1970 | Ivanto | 414/794.4 |
| 3,548,895 | 12/1970 | Gentry, Jr. | 414/794.4 X |
| 3,594,977 | 7/1971 | Grasvoll | 414/791.6 X |
| 3,612,300 | 10/1971 | Berghgracht | 414/792.2 |
| 3,637,095 | 1/1972 | Kampfer | 414/331 |
| 3,667,628 | 6/1972 | Gabler et al. | 414/788.9 |
| 3,730,357 | 5/1973 | Beaty et al. | 414/788.9 |
| 3,844,422 | 10/1974 | Smith et al. | 414/789.9 |
| 3,876,057 | 4/1975 | Jones | 414/792.6 X |
| 3,955,613 | 5/1976 | Lund | 198/575 X |
| 3,967,716 | 7/1976 | Smith | 198/429 X |
| 4,043,459 | 8/1977 | Moreau | 414/793.8 X |
| 4,073,387 | 2/1978 | Bowser | 414/792.6 |
| 4,128,163 | 12/1978 | Rana et al. | 198/796 |
| 4,128,183 | 12/1978 | Finlayson | 414/666 |
| 4,212,579 | 7/1980 | Stromberg | 414/789.9 |
| 4,214,848 | 7/1980 | Verwey et al. | 414/793.5 |
| 4,271,755 | 6/1981 | Kintgen et al. | 414/793.4 X |
| 4,539,119 | 9/1985 | Cann | 210/711 |
| 4,557,656 | 12/1985 | Ouellette | 414/790 |

(List continued on next page.)

FOREIGN PATENT DOCUMENTS

| | | |
|---|---|---|
| 0232913 | 8/1987 | European Pat. Off. . |
| 0253790 | 1/1988 | European Pat. Off. . |
| 0359920 | 3/1990 | European Pat. Off. . |
| 671566 | 9/1989 | Switzerland . |

*Primary Examiner*—Steven A. Bratlie
*Attorney, Agent, or Firm*—Sten Erik Hakanson

[57] ABSTRACT

The present invention comprises a cart loading machine that provides for improved operating efficiencies, and includes a cart loading station, an infeed conveyor, a pattern forming area, a carrier sheet and wiping mechanism, and a fork loading apparatus. The cart loading station includes a framework defining a cart loading position and a cart waiting position. With the carrier in its extended position having carried a fully formed pattern to the cart loading position, a wiping mechanism is extended from beneath the carrier plate to contact the bundles as they sit on the carrier so that when the carrier moves back to its retracted position, the bundles are blocked and stripped therefrom. The wiping mechanism is then retracted below the carrier to permit the loading of a subsequent pattern of bundles thereon. This wiping mechanism eliminates the need for an overhanging blocking mechanism thereby permitting more efficient loader design and easier access to the pattern forming and bundle stripping areas.

31 Claims, 21 Drawing Sheets

6,056,496

Page 2

U.S. PATENT DOCUMENTS

| | | | |
|---|---|---|---|
| 4,565,129 | 1/1986 | Simeth et al. | 101/240 |
| 4,634,333 | 1/1987 | Butterly et al. | 414/331 |
| 4,701,091 | 10/1987 | Yamauchi et al. | 414/398 X |
| 4,708,564 | 11/1987 | Mylrea et al. | 211/134 |
| 4,732,172 | 3/1988 | Pedersen | 134/62 |
| 4,753,356 | 6/1988 | Nootenboom et al. | 211/134 |
| 4,787,799 | 11/1988 | Platteschorre | 414/400 X |
| 4,810,155 | 3/1989 | D'Agnolo | 414/398 X |
| 4,917,559 | 4/1990 | van der Schoot | 414/331 |
| 4,929,140 | 5/1990 | Baker | 414/267 |
| 4,944,228 | 7/1990 | Rhodes | 104/172.3 |
| 4,947,978 | 8/1990 | Rhodes | 198/341 |
| 4,972,936 | 11/1990 | Kura | 198/465.1 |
| 4,972,937 | 11/1990 | Aarts | 198/465.2 |
| 4,984,677 | 1/1991 | Prakken | 198/418.6 |
| 5,012,917 | 5/1991 | Gilbert et al. | 198/465.2 |
| 5,018,927 | 5/1991 | Tanaka | 414/331 |
| 5,051,058 | 9/1991 | Roth | 414/789.1 |
| 5,085,553 | 2/1992 | Bouwens et al. | 414/331 |
| 5,181,820 | 1/1993 | Sjogren et al. | 414/400 X |
| 5,201,626 | 4/1993 | Hansen | 414/398 |
| 5,271,334 | 12/1993 | Sweet et al. | 104/102 |
| 5,407,055 | 4/1995 | Tanaka | 198/429 |
| 5,437,537 | 8/1995 | Sweet et al. | 414/400 |

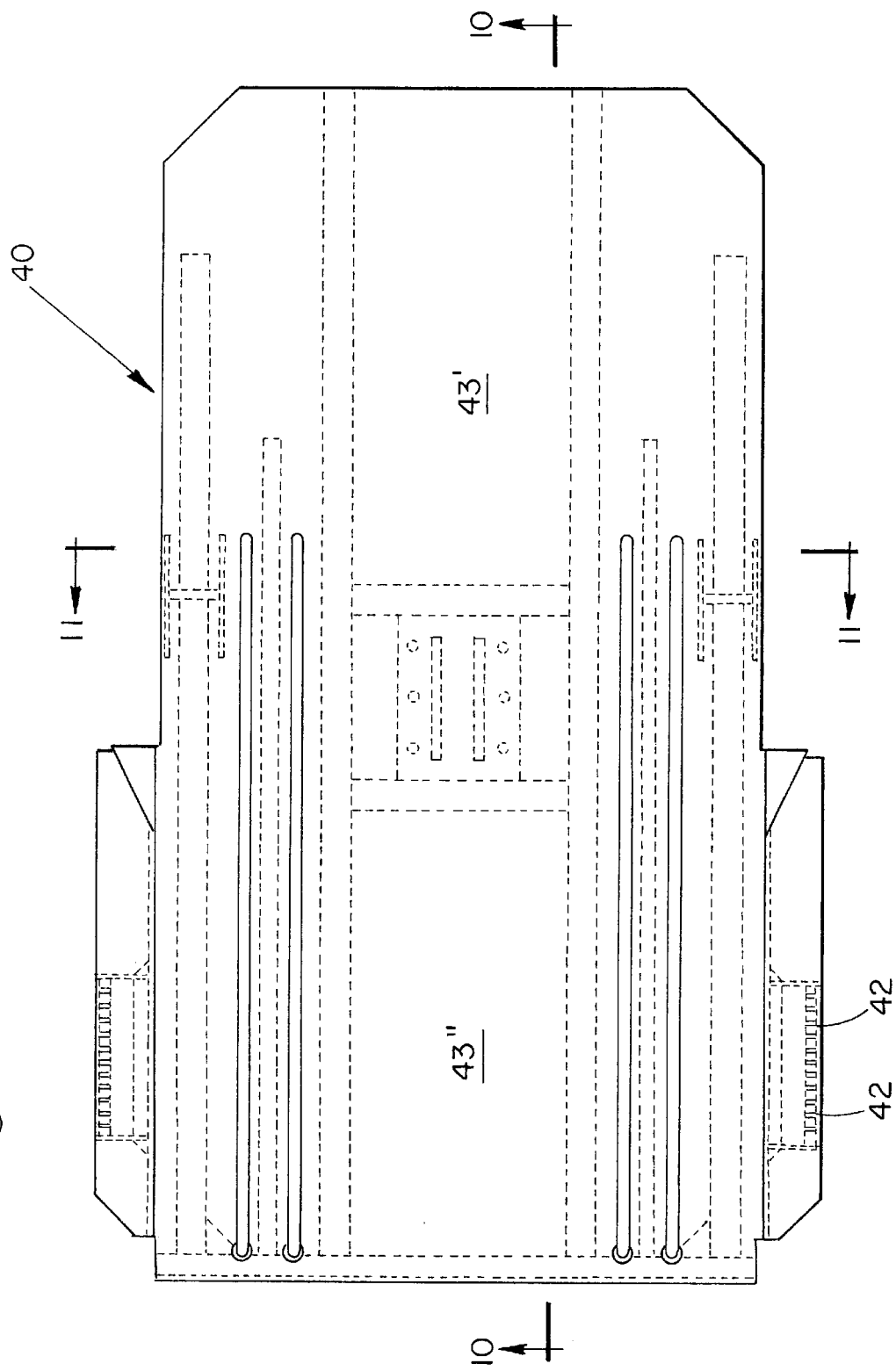

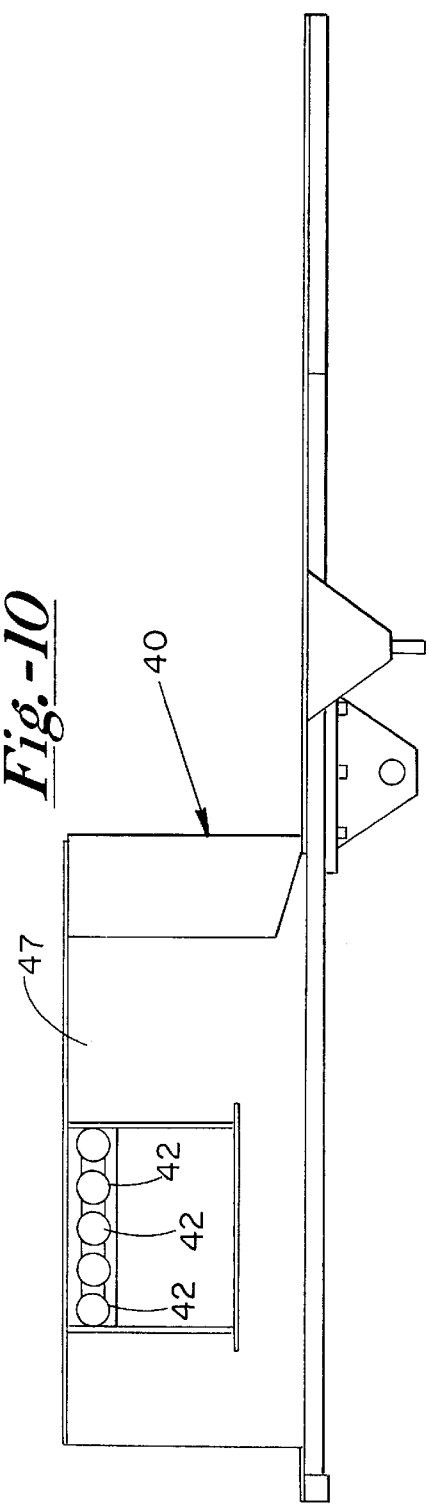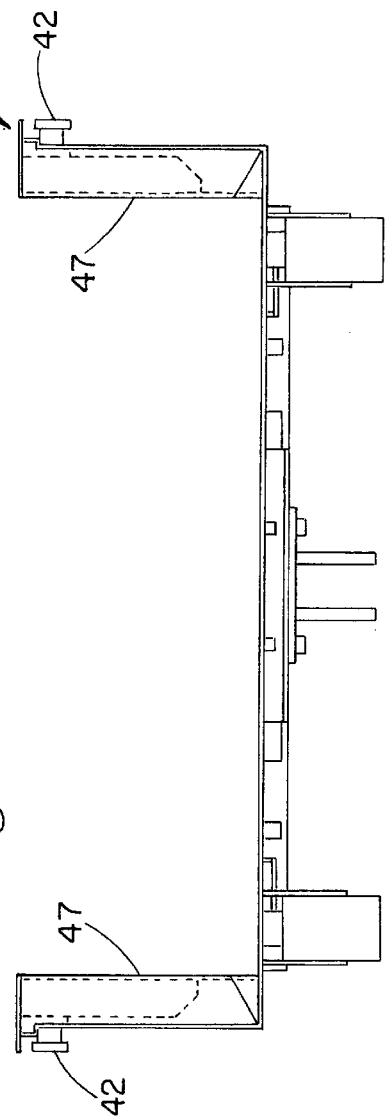

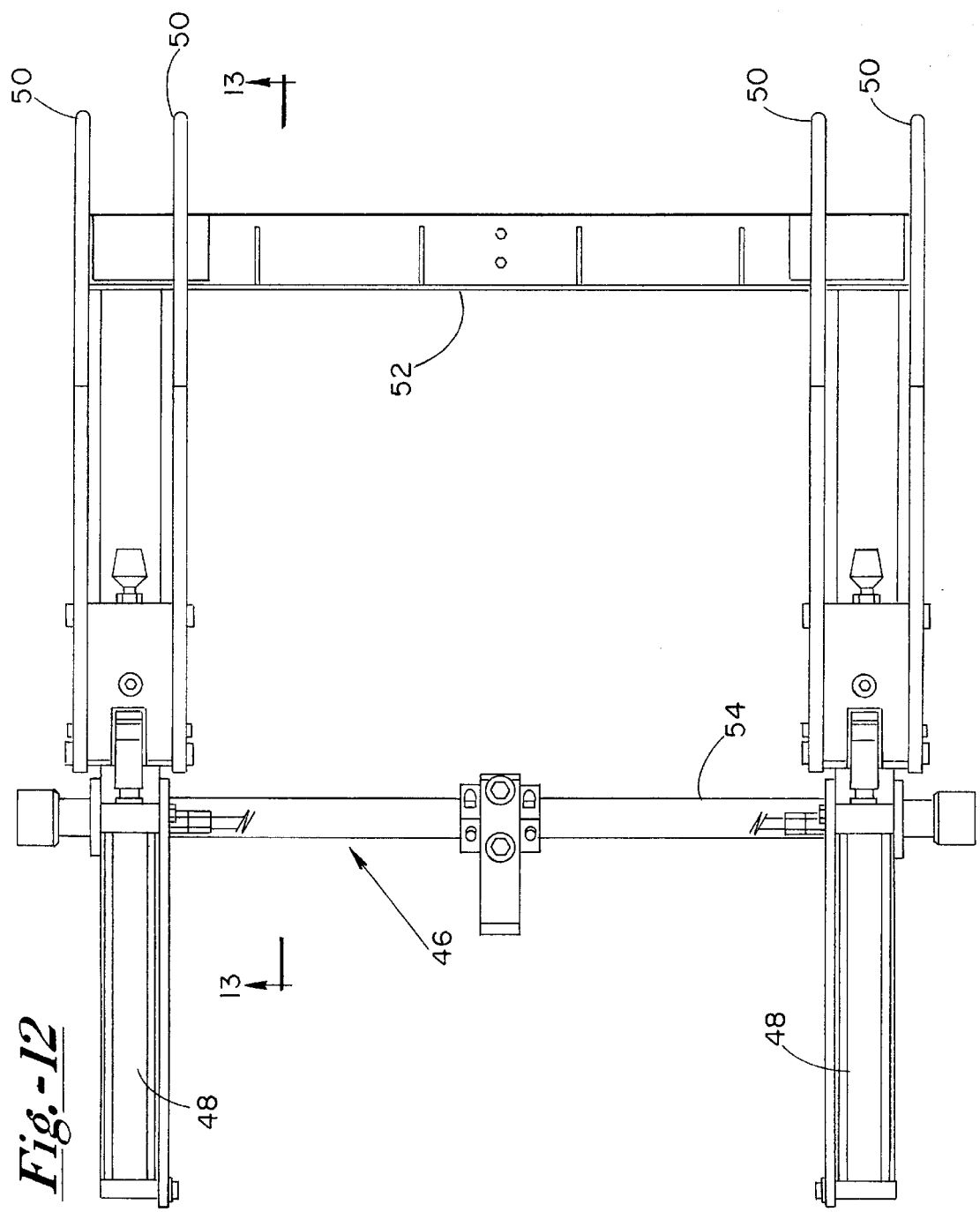

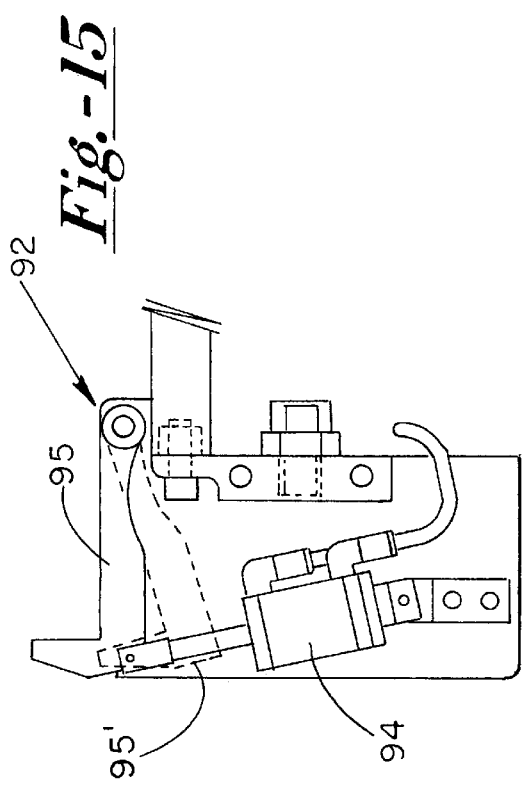
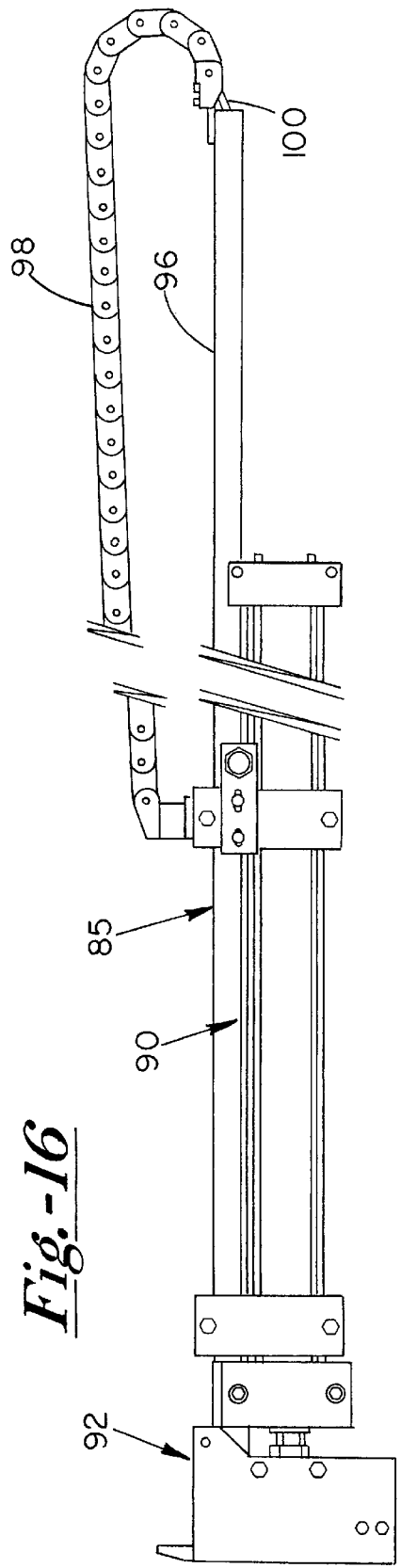

CART LOADER AND METHOD OF LOADING

This application claims benefit of provisional application Ser. No. 60/020,167 filed Jun. 21, 1996.

BACKGROUND OF THE INVENTION

1. Field of the Invention

The present invention relates generally to cart loading equipment, and in particular to automated equipment for loading newspaper bundles into carts.

2 Background

Newspaper bundle loading equipment is known in the art and serves to load newspaper bundles into wheeled carts so that the bundles can then be conveniently handled and distributed. As is known in the art, there exist "football" bundles, so called because of their somewhat rounded shape. These bundles can sometimes present difficulties with respect to the tearing thereof when loaded into a cart. Accordingly, it would be desirable to have a means for handling such bundles that minimizes any tearing thereof. In addition, it would also be desirable to have greater operator accessibility to such loading equipment so that, during use, any interruptions of operation can be more quickly dealt with. In general, it would further be desirable to provide for an overlap of functions to provide for maximum throughput of bundles and do so in a manner consistent with simplicity of loader design and construction.

SUMMARY OF THE INVENTION

The present invention comprises a cart loading machine that provides for improved operating efficiencies, and includes a cart loading station, an in-feed conveyor, a pattern forming area, a carrier sheet and wiping mechanism, and a fork loading apparatus.

The cart loading station includes a framework defining a cart loading position and a cart waiting position. Drive means provide for ejecting a loaded cart from the cart loading position and for moving an empty cart laterally from the cart waiting position to the cart loading position. in-feed conveyor usually provides for delivering a single file line of bundles to the pattern forming area. Pairs of bundles are delivered to a first position adjacent to the pattern forming area and adjacent a pushing plate. The pushing plate moves a first pair of bundles from the first position on to a carrier sheet located in a pattern forming area. A second pair of bundles are then subsequently moved from the first position onto the carrier sheet. In this manner a pattern of four bundles is formed on the carrier sheet in the pattern forming area as the carrier rests in a retracted position. The carrier is then moved from its retracted position to an extended cart loading position wherein the four bundles are then located directly above the top of the empty cart in the cart loading area. Thus, the pattern of bundles is first formed in a pattern forming area, after which the fully formed pattern is then moved to a position directly over the cart.

The fork loading apparatus includes a fork with individual tines that extend horizontally and can be moved between an extended bundle receiving position and a retracted position. In addition, the fork can be moved vertically to a plurality of positions between a top position and a bottom position. With an empty cart in the cart loading position, the fork is moved to the top position and then to the extended position. The tines are spaced so that they extend into the interior of the cart through correspondingly spaced vertical support channels forming an end wall of the cart. With the carrier in its extended position having carried a fully formed pattern to the cart loading position, a wiping mechanism is extended to contact the bundles as they sit on the carrier so that the carrier can move back to its retracted position without carrying the bundles therewith. In this manner, the bundles are stripped or swept from the carrier whereupon they then fall into the cart and land on the fork tines. The wiping mechanism is then retracted to permit the movement of a subsequent pattern of bundles to a position above the cart. While extended, the fork tines are incremented down a sufficient distance to be in the proper position to receive this subsequent layer of bundles. The above operations are repeated until the fork is at the bottom position and the cart is fully loaded with bundles. The fork is then moved to the retracted position and the fully loaded cart is ejected from the loading position so that a further cart can be loaded as above described. As, or just prior to, the carrier moving back to its retracted position, further bundle pairs can be loaded thereon. Of course, bundle pairs can be loaded into the first position adjacent the pusher at any time that such area is open and the main pusher is retracted. Therefore, the present invention provides for an overlap in functions with respect to pattern forming, carrier retraction and regulated movement of bundle pairs into the first position. As a result thereof, the present invention maximizes the speed at which a cart can be loaded.

When the bundles are of the football type, i.e. more rounded than rectangular, then a modified loading procedure from the one above described is used. The modified procedure involves a re-forking strategy. It has been discovered, for example, with three layers of football bundles, that the middle layer can be forced outwardly against the walls of the cart by the weight of the third layer thereon and as a result of the roundness of all the bundles. This force can be sufficient wherein, as the bundles are moved downward to receive a fourth layer, the middle layer bundles can come in contact with wall portions of the cart, such as horizontal cross members or door mechanisms, that can cause tearing thereof. The loading device of the present invention includes a computer control, and in particular, the control can be programmed to regulate the number of layers permitted on the fork before it will be required to move downward to the bottom or lowermost position and deposit such number of bundle layers in the cart. Thus, for example, the loading mechanism of the present invention can be programmed to permit only two layers on the fork at any one time. Therefore, after two such layers are deposited thereon, the fork is lowered to the bottom position withdrawn to the retracted position thereby depositing two layers on the bottom of the cart. The fork is then lifted to the top position and extended for the loading thereon of two further bundle layers whereupon it is again moved downward, but in this case to a position just above the top of the previously deposited bundles. The fork is again retracted resulting in the placement of the further two bundle layers on top of the first two. Of course, this process is repeated until the cart is fully loaded. It will be appreciated by those of skill that this re-forking process greatly facilitates the handling of football bundles in preventing unwanted tearing thereof by limiting any outward pressure exerted on a particular layer or layers of the bundles. The control of the present invention is programmable to suit the particular bundle characteristics such that any number of layers, for example, one, two or three can be selected as the maximum number between re-forking operations.

DESCRIPTION OF THE DRAWINGS

A further understanding of the structure, function, operation, and advantages of the present invention can be had by referring to the following detailed description which refers to the following figures, wherein:

FIG. 9 shows a top plan view of the carrier sheet.

FIG. 10 shows a side plan view along lines 10—10 of FIG. 9.

FIG. 11. shows an end plan view along lines 11—11 of FIG. 9.

FIG. 12 shows an enlarged top plan view of the wiping mechanism.

FIG. 15 shows an enlarged side plan view of a cart engaging head.

FIG. 16 shows a side plan view of a cart engaging head and corresponding extending cylinder.

DETAILED DESCRIPTION OF THE INVENTION

Figure 1:
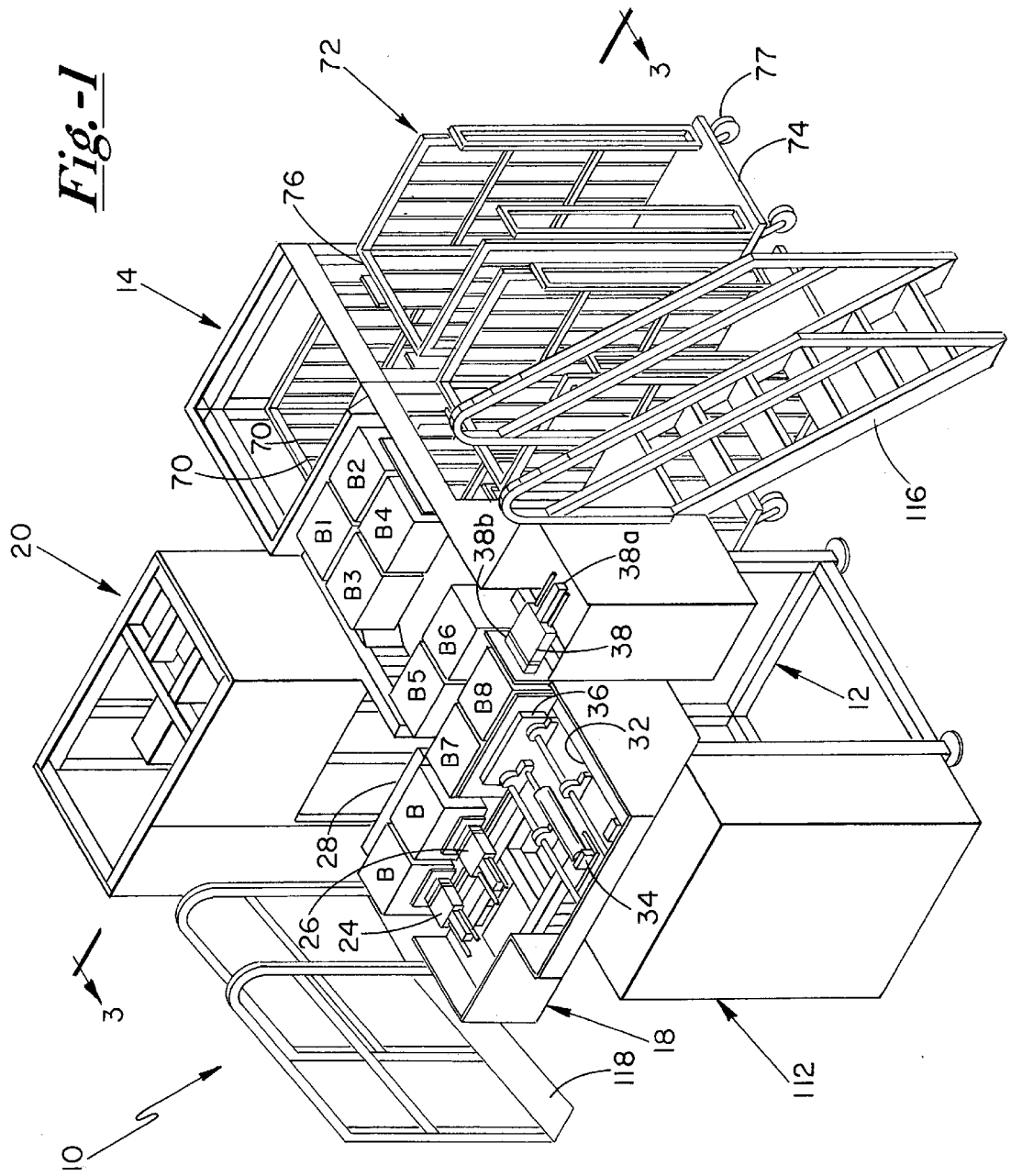
FIG. 1 shows perspective view of the present invention.

The cart loader of the present invention is seen in the various FIGS. and generally indicated by the numeral 10. Loader 10 includes a framework 12 and the main functional sections of a cart loading station 14, an in-feed conveyor 16, a pattern forming and transporting portion 18 and a fork loading apparatus 20.

Figure 2:
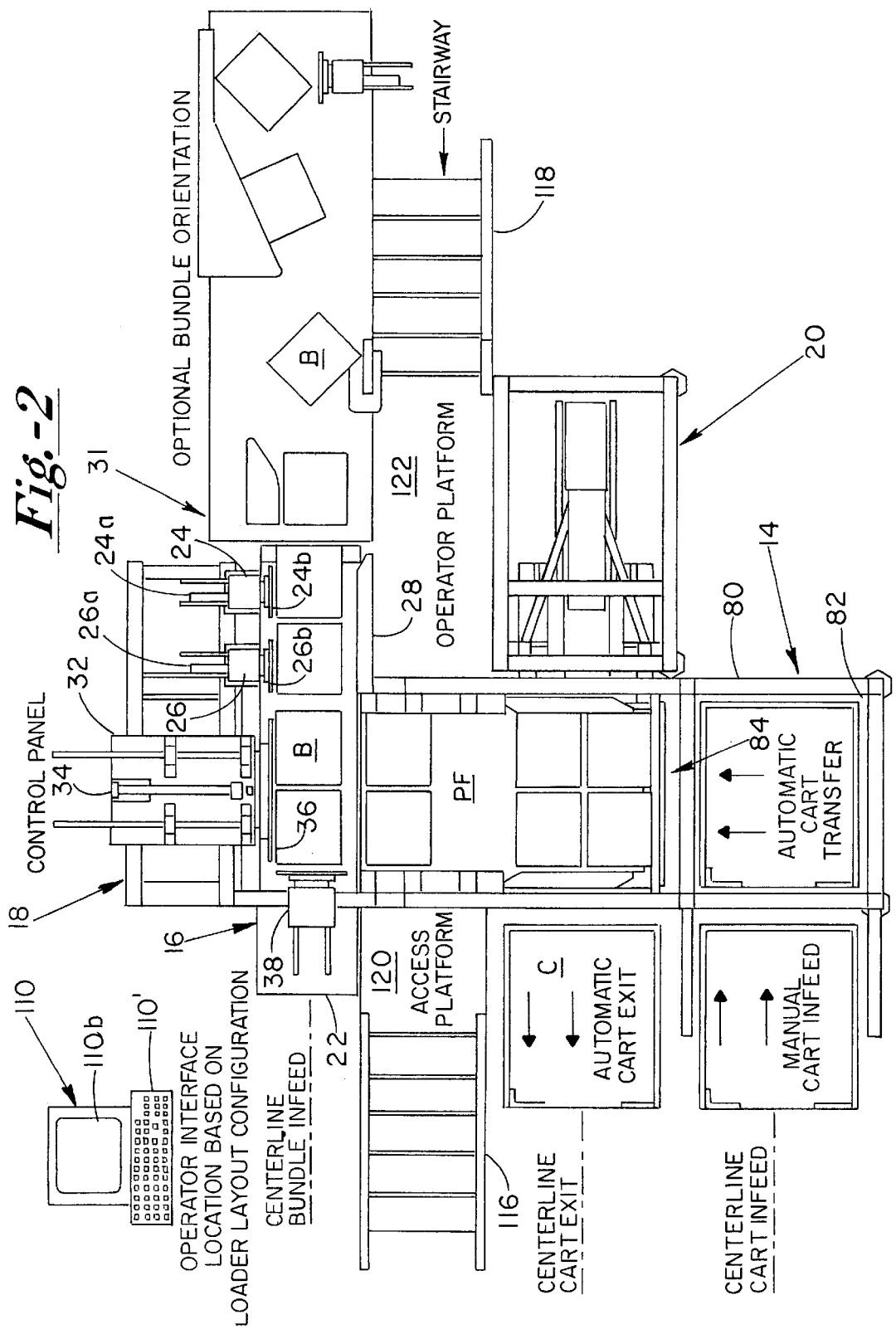
FIG. 2 shows a top plan view of the present invention.
Figure 3:
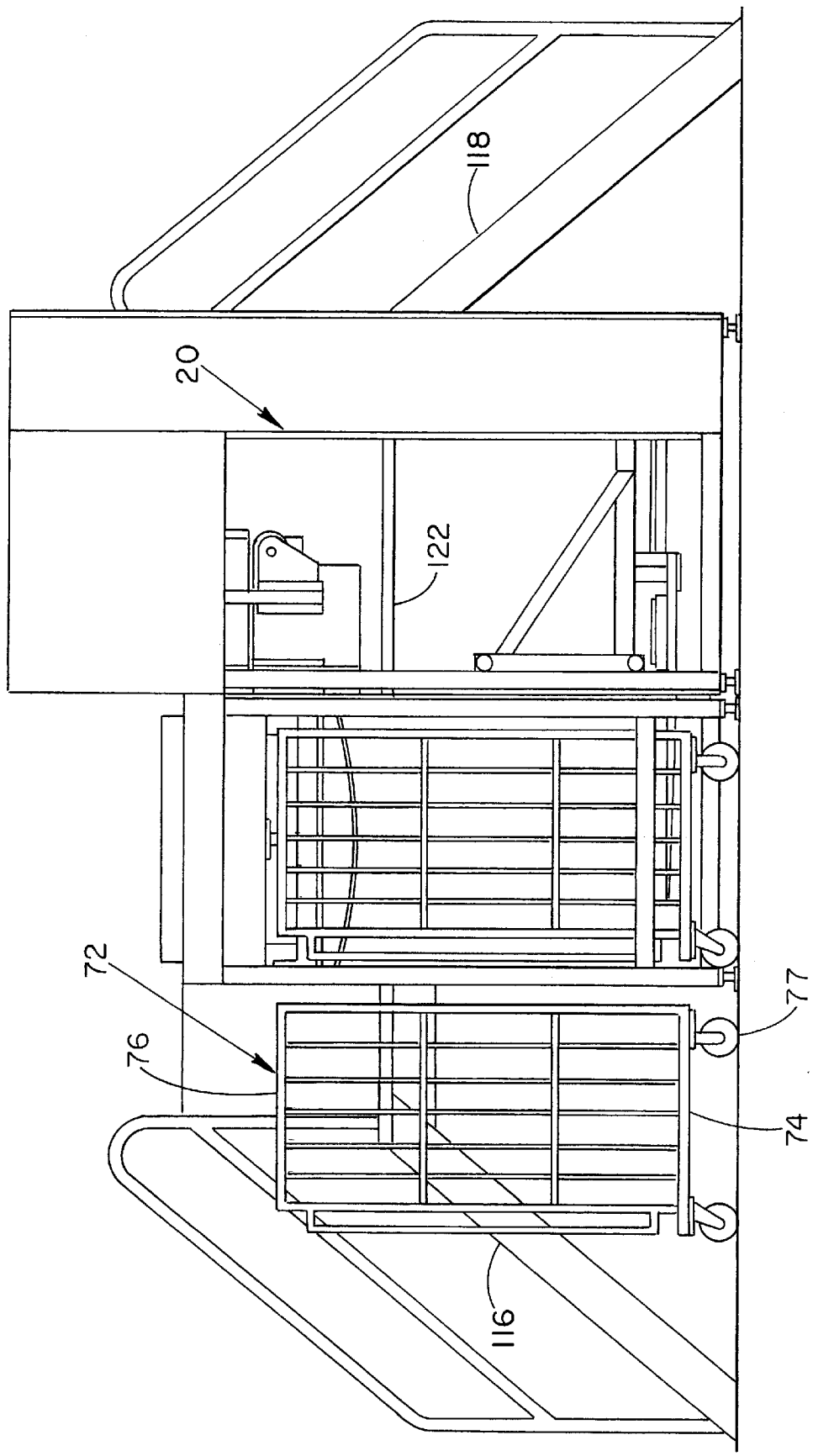
FIG. 3 shows a side plan view of the present invention along lines 3—3 of FIG. 1.
Figure 4:
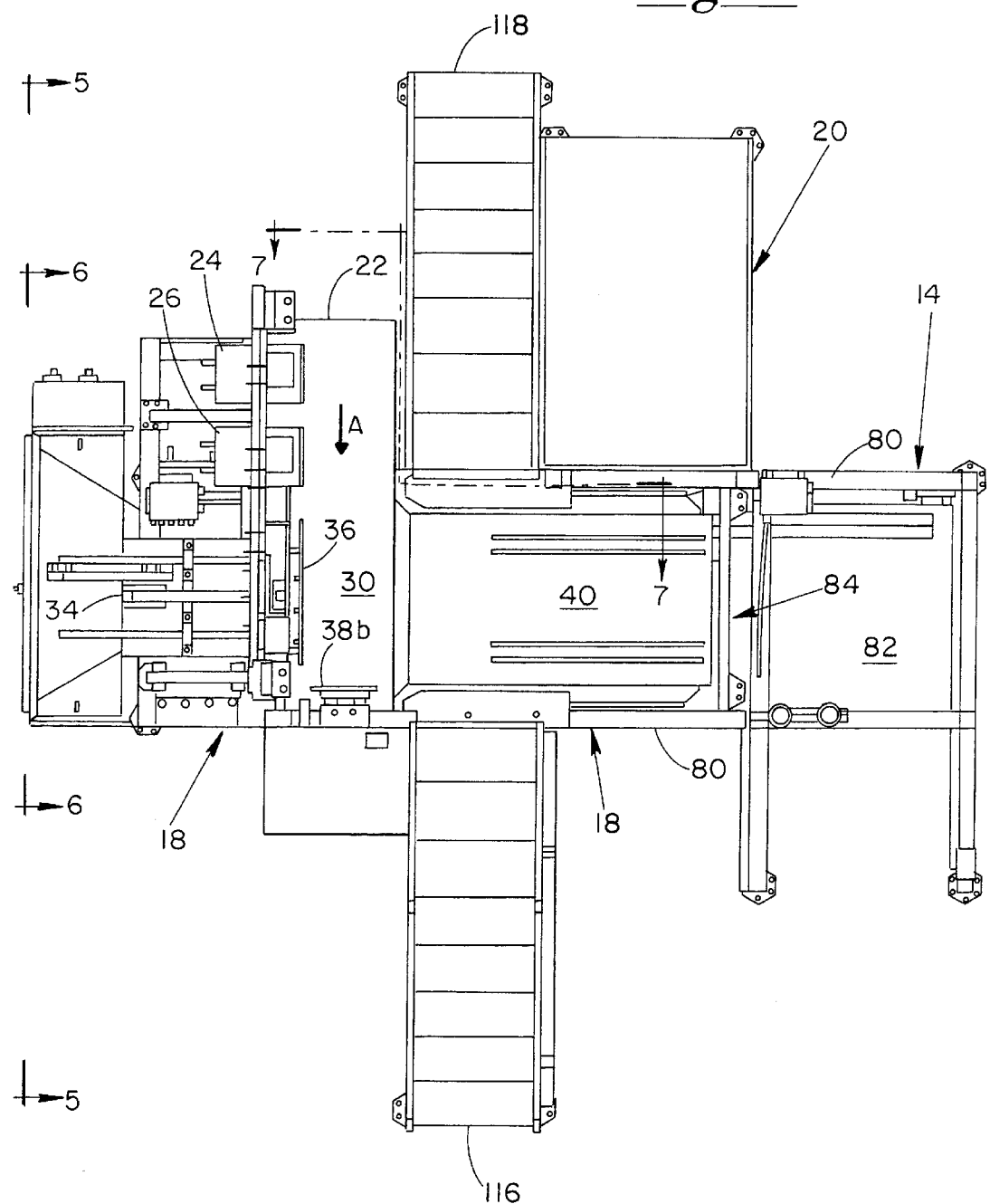
FIG. 4 shows a further top plan view of the present invention.
Figure 5:
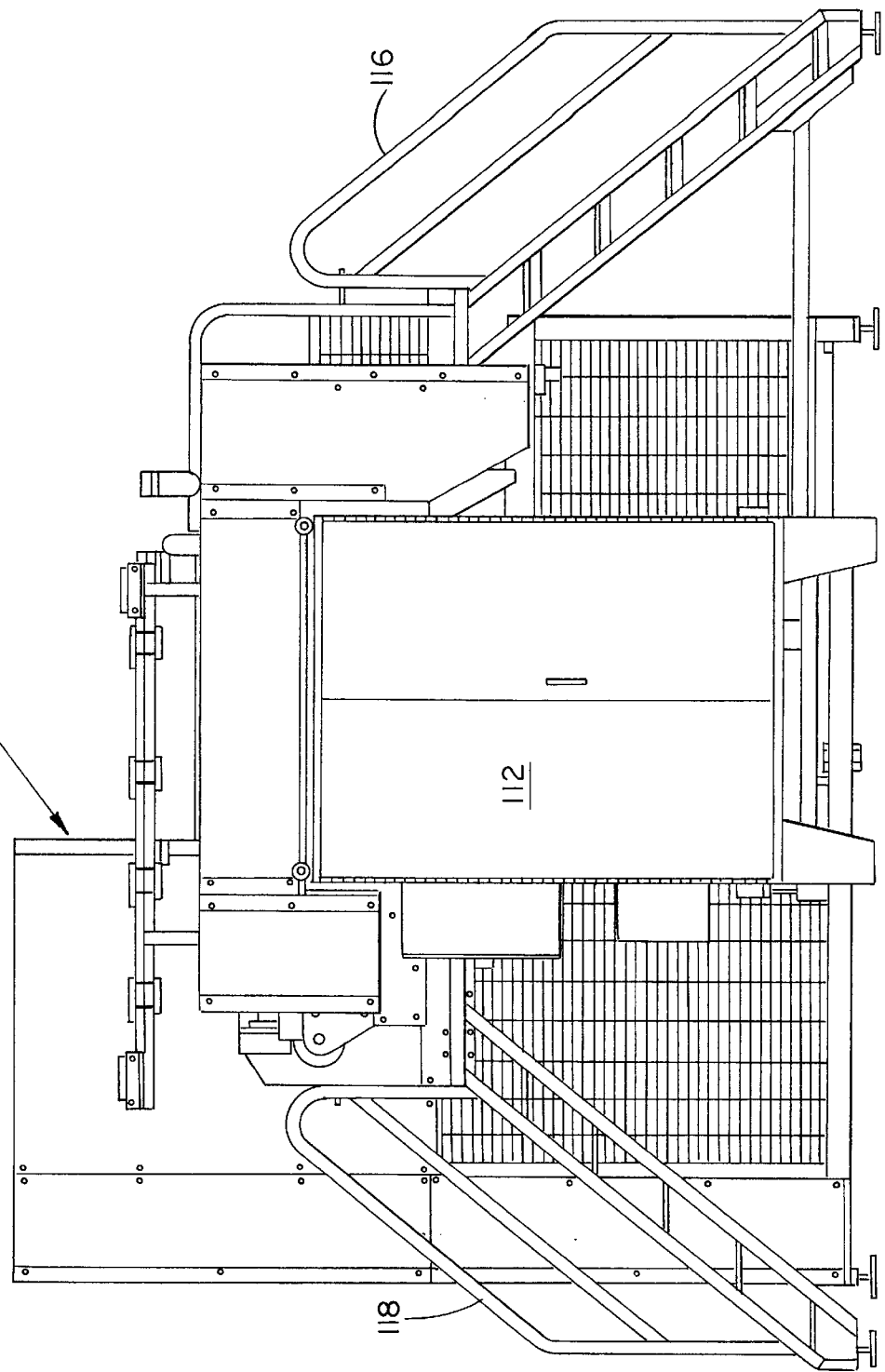
FIG. 5 shows a side plan view along lines 5—5 of FIG. 4.
Figure 6:
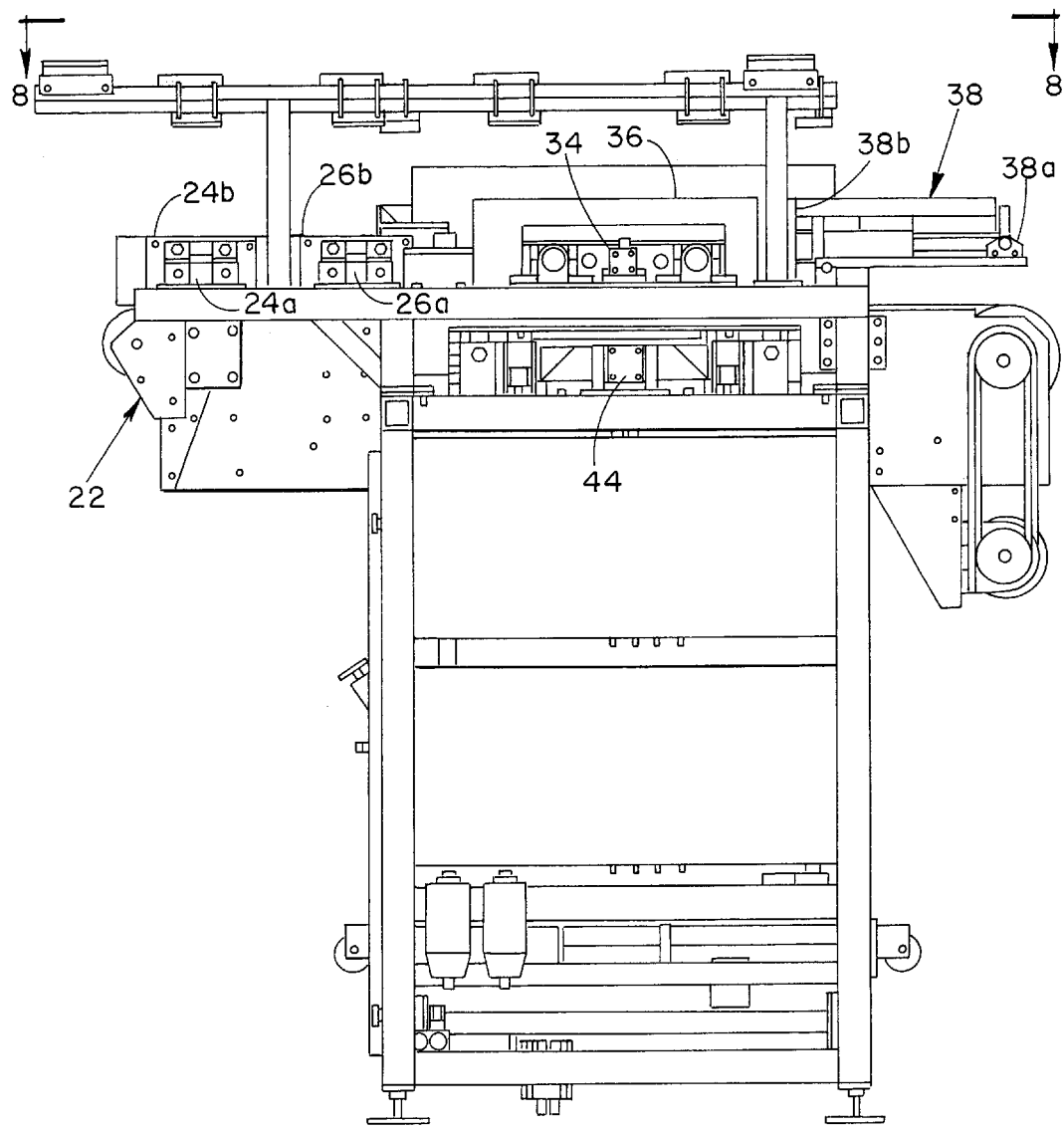
FIG. 6 shows an enlarged side plan view along lines 6—6 of FIG. 4.
Figure 7:
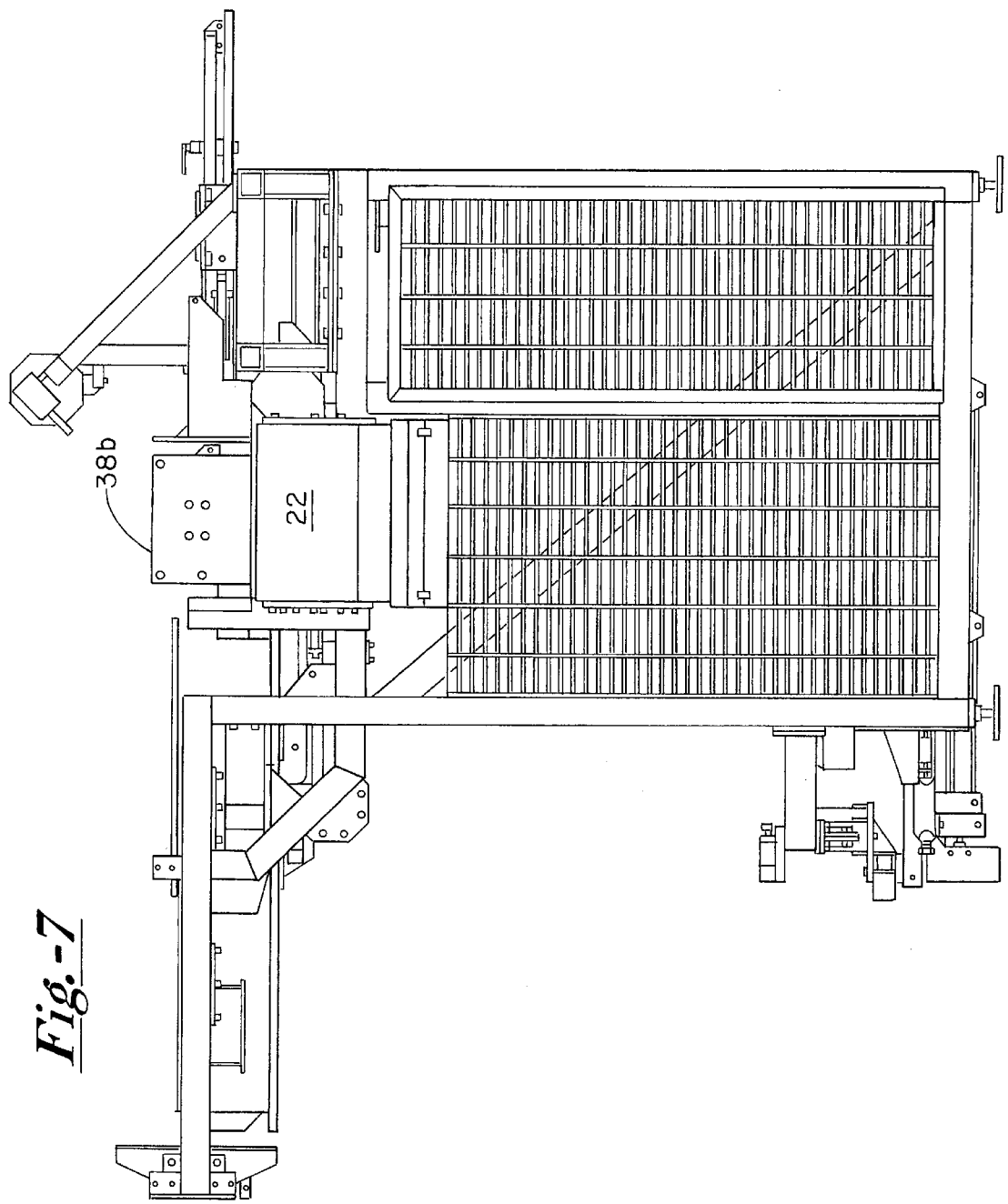
FIG. 7 shows an enlarged side plan view along lines 7—7 of FIG. 4.

A seen by referring to FIGS. 1,2,4 and 6–8, infeed conveyor 16 includes a continuous conveying means 22, such as a belt or powered roller conveyer, for moving bundles B in the direction indicated by the arrows A. Clamps 24 and 26 function independently to extend and retract plates 24b and 26b thereof to clamp bundles B against a rigid plate 28. In this manner clamps 24 and 26 provide for regulating movement of bundles B into a first bundle position area 30. As seen in FIG. 2, a bundle orientation means 31, well known in the art, can be included as an optional device for orienting bundles B in a desired orientation.

Figure 8:
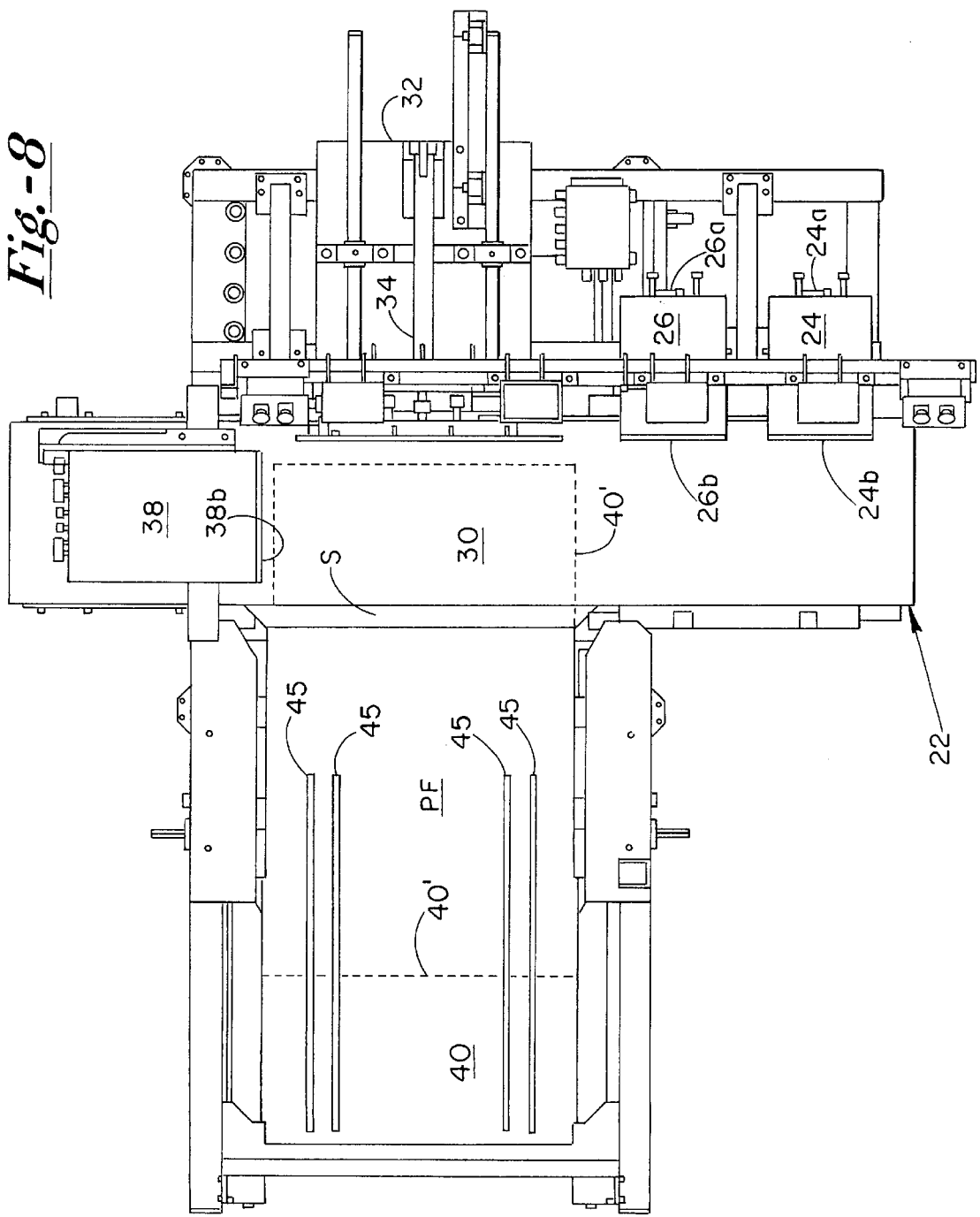
FIG. 8 shows a top plan view along lines 8—8 of FIG. 6.

A main pusher 32 is mounted to portion 18 and includes a power cylinder 34 and pushing plate 36. A further pusher 38 is mounted at the end of conveyor 22 and includes a cylinder 38a and a plate 38b. A carrier plate or sheet 40 is slidably mounted to frame 12 by rollers 42 and is operable by a cylinder 44 to a fully extended position as seen in FIG. 8 and indicated by the solid lines thereof and a retracted position as indicated by the dashed line 40'. Carrier 40 includes a leading end 43' and a trailing end 43". As better understood by referring to FIG. 6, carrier 40 extends horizontally at a level below that of conveyor 22. This positioning permits the retraction of carrier 40 wherein a portion thereof moves beneath the conveying surface of conveyor 22. Carrier 40 includes two pairs of elongate tine receiving slots 45 extending there through and along a portion of the length thereof. In addition carrier 40 includes a pair of vertical bundle guiding walls 47.

Figure 13:
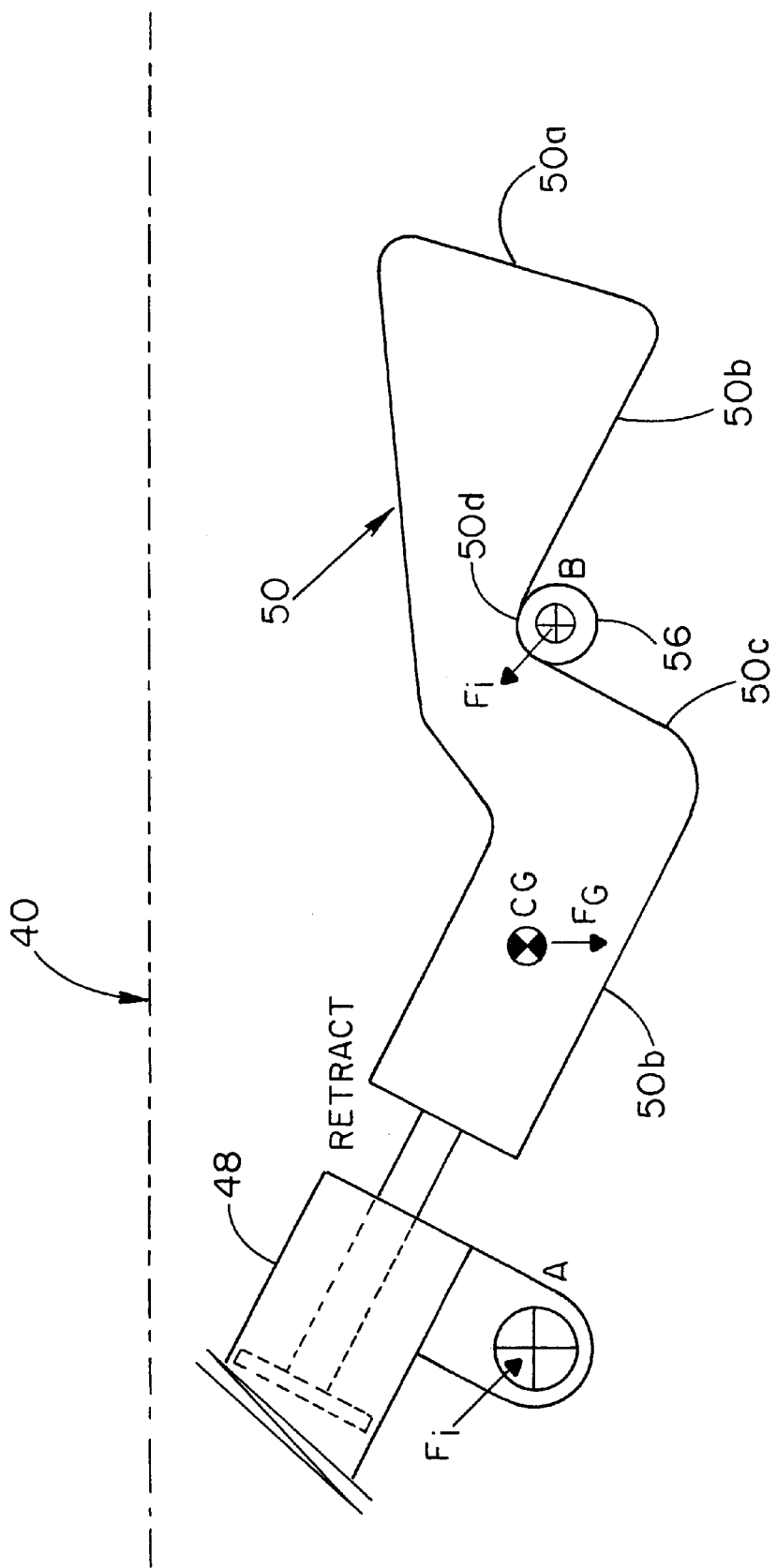
FIG. 13. shows a side plan view of the present invention along lines 13—13 of FIG. 12.
Figure 14:
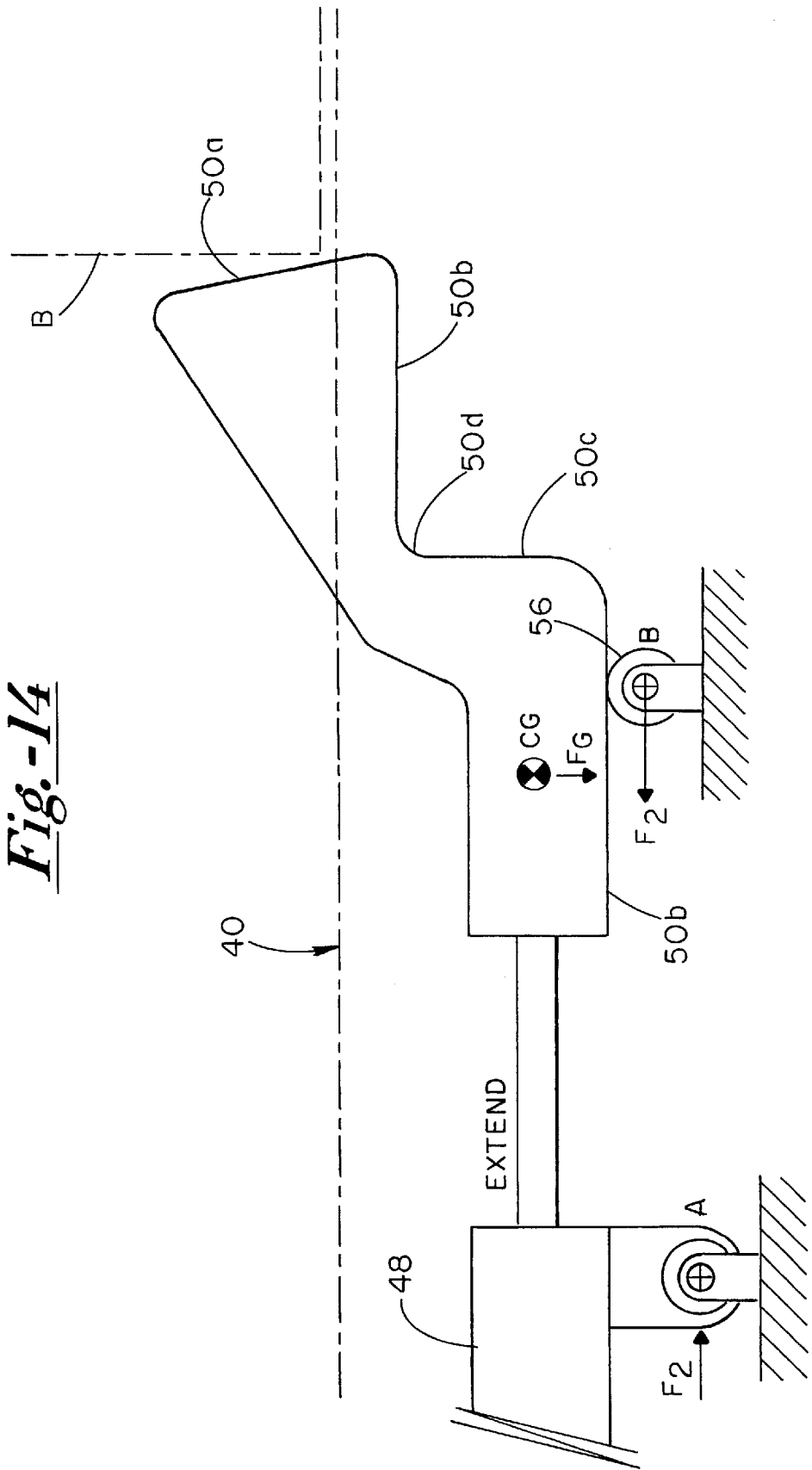
FIG. 14. shows a side plan view of the present invention along lines 14—14 of FIG. 12.
Figure 17:
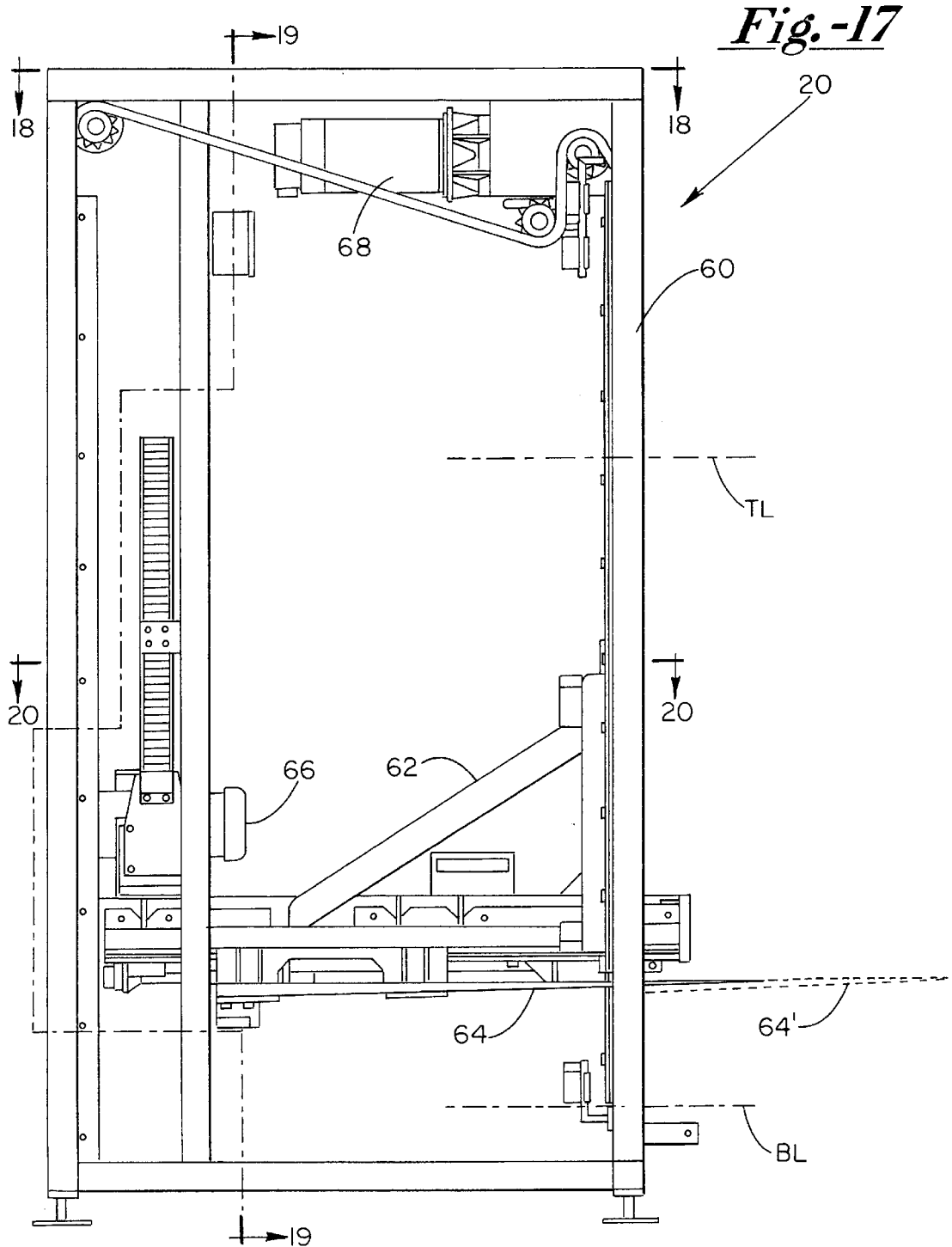
FIG. 17 shows a side plan view of the fork loading apparatus.
Figure 18:
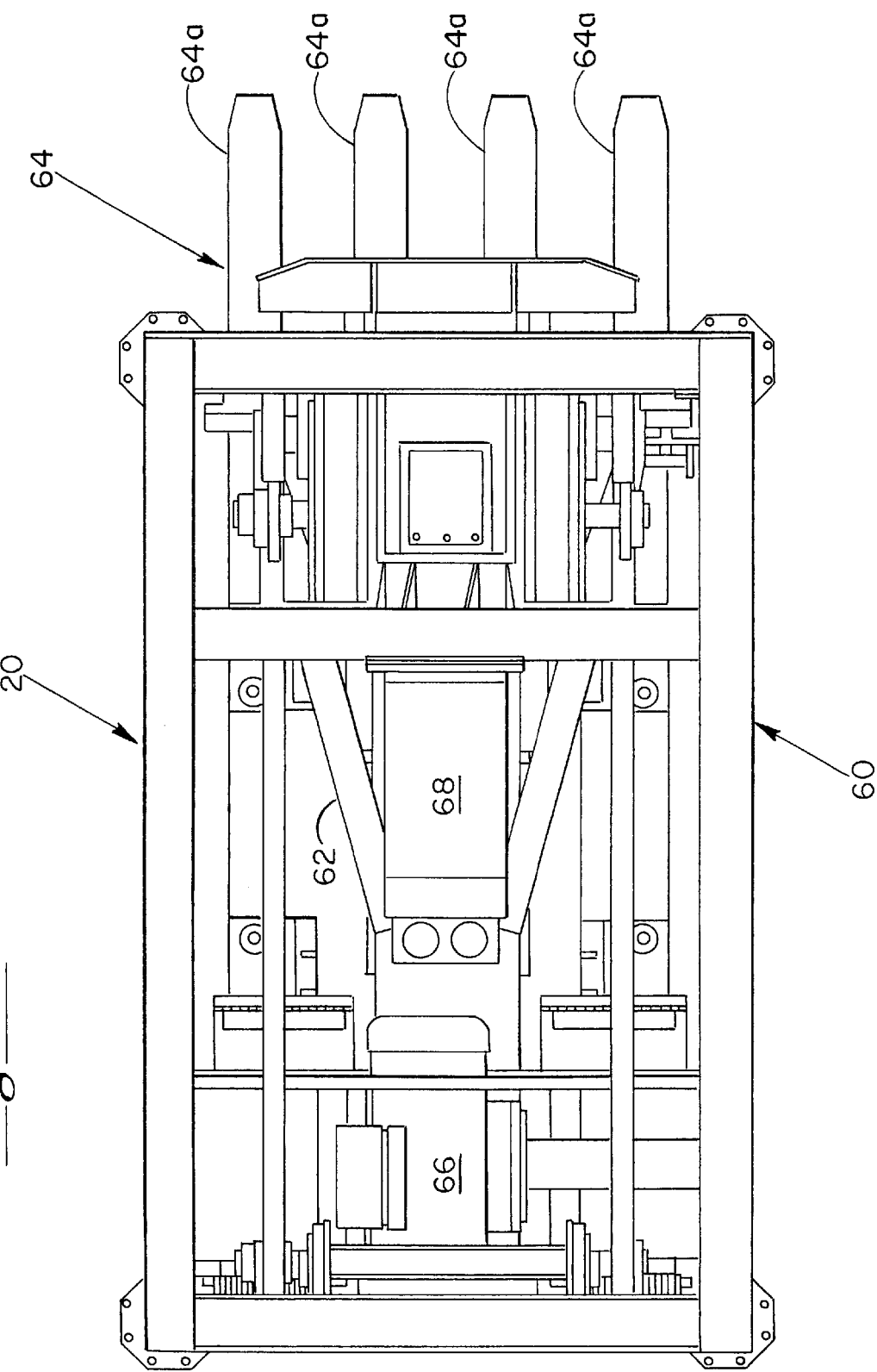
FIG. 18 shows a top plan view along lines 18—18 of FIG. 17.
Figure 19:
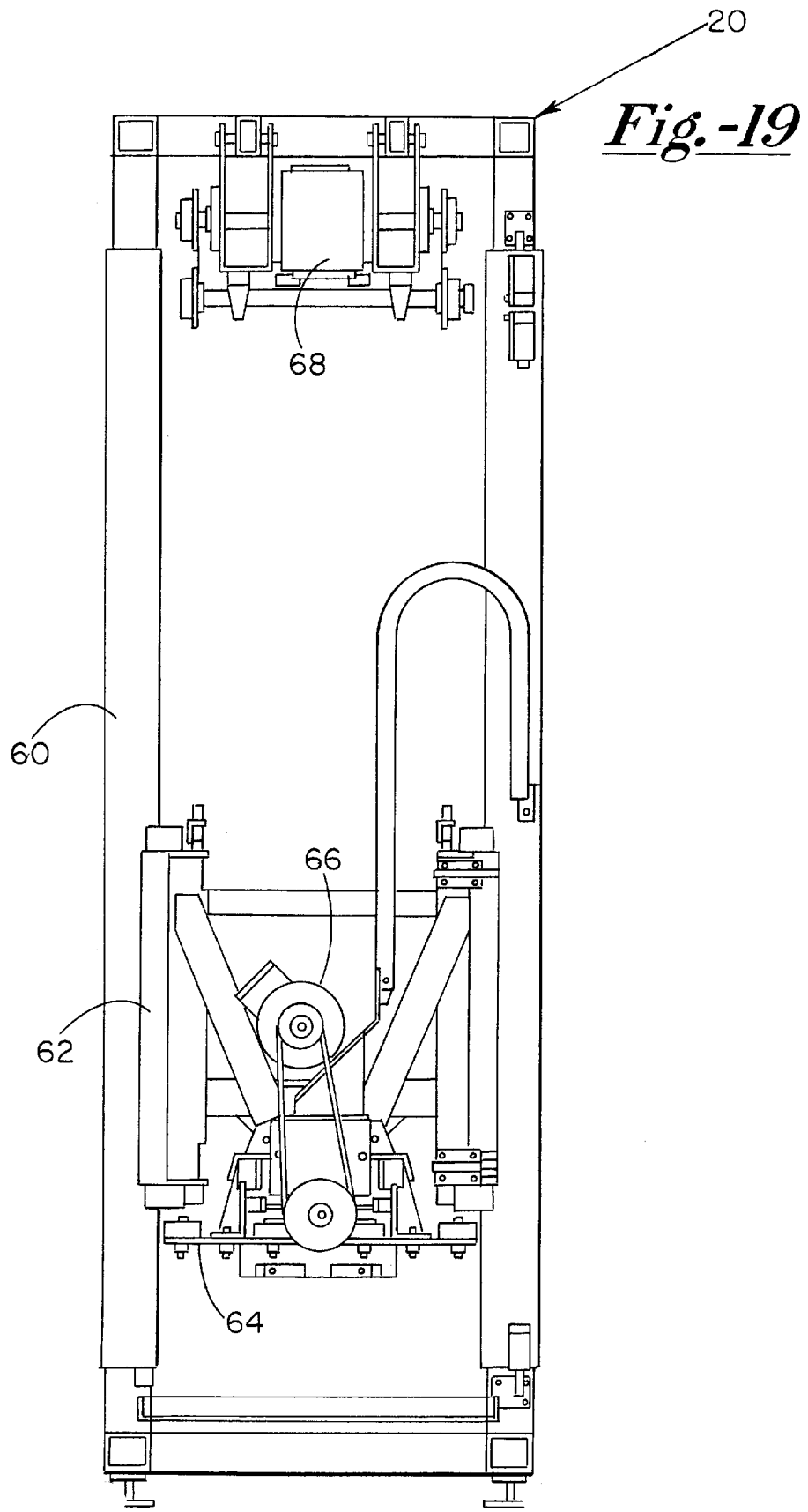
FIG. 19 shows a side plan view along lines 19—19 of FIG. 17.
Figure 20:
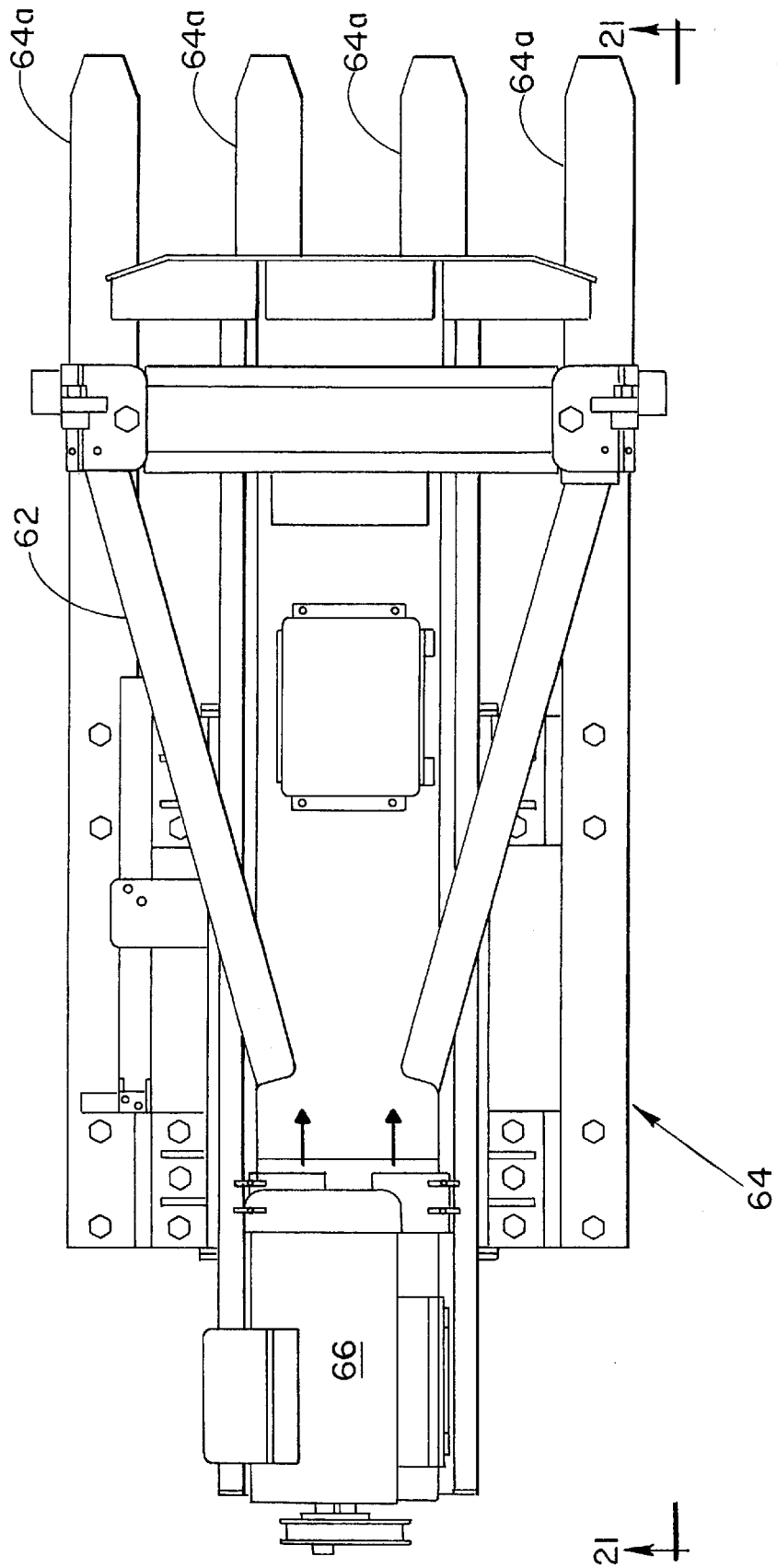
FIG. 20 shows an enlarged top plan view along lines 20—20 of FIG. 17.
Figure 21:
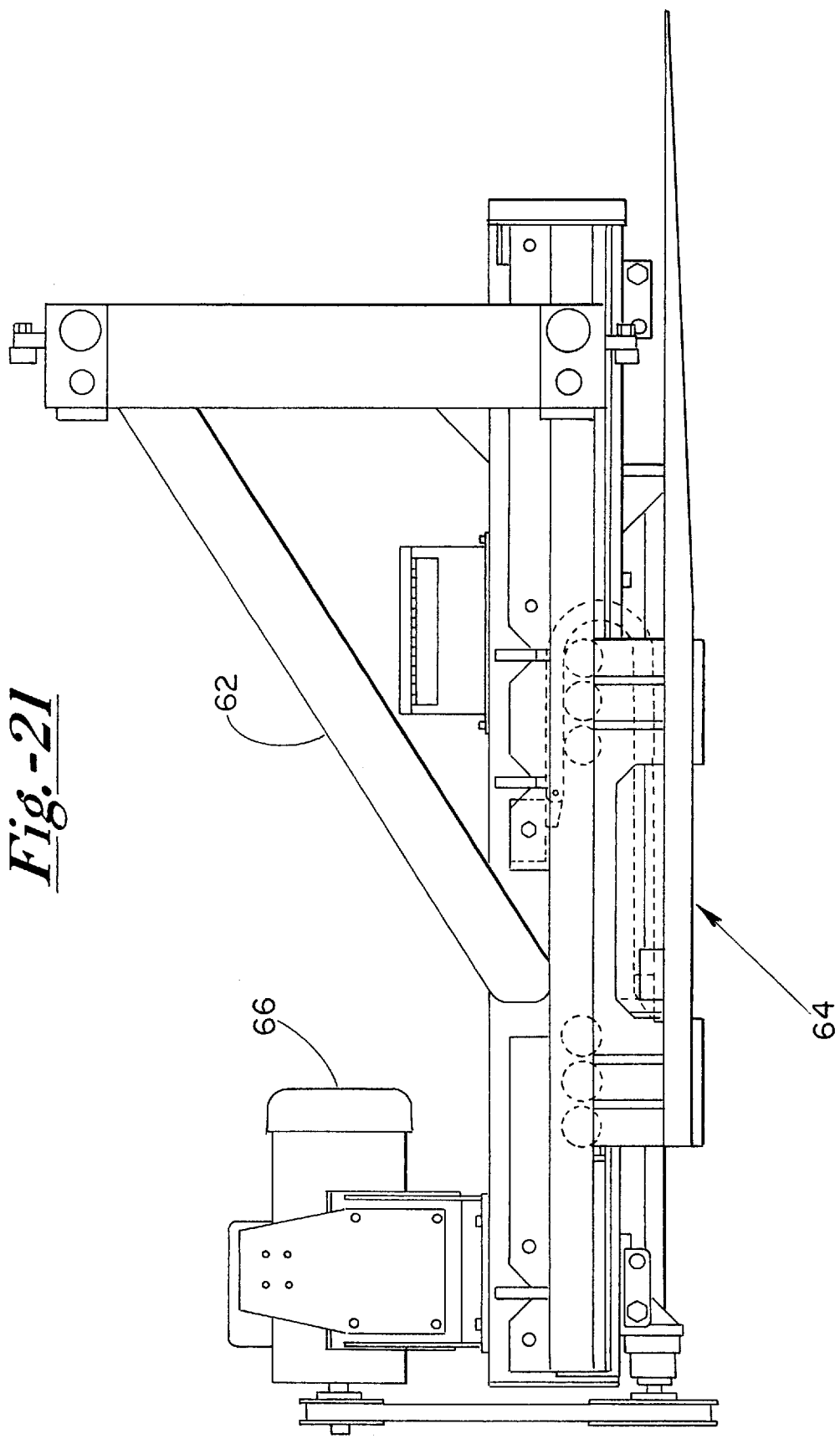
FIG. 21 shows a side plan view along lines 21—21 of FIG. 20.
Figure 22:
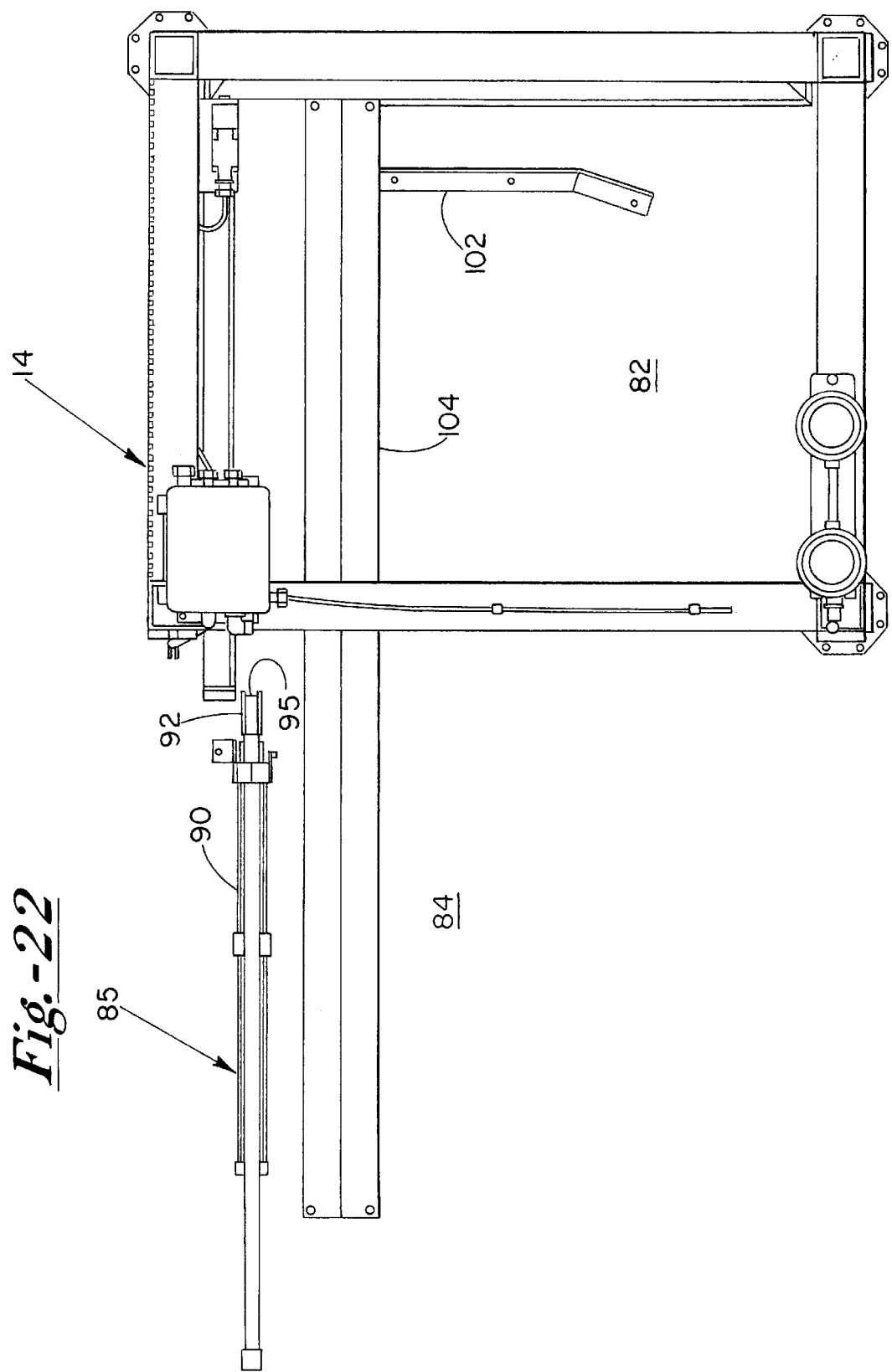
FIG. 22 shows a top plan view of the cart loading station.

As seen by referring also referring to FIGS. 12–14, a wiper mechanism 46 includes a pair of power cylinders 48 each connected to pairs of bundle stop tines 50. Tine pairs 50 are secured together by a rigid connecting member 52 and both cylinders 48 pivot about a rod 54. Tines 50 each include a stop surface end portions 50a. The bottom surfaces of tines 50 include a substantially horizontal portion 50b, a substantially vertical portion 50c and a notch area 50d. Bottom surface positions 50b and 50c ride on rollers 56 as the result of extension and retraction of cylinders 48.

As seen by referring to FIGS. 17–21 the fork loading apparatus 20 includes a frame structure 60 in which a fork carrier frame 62 is slidably mounted. Carrier 62 includes a fork 64 slidably mounted thereto and operable by a drive mechanism 66. Specifically, drive 66 provides for extending and retracting fork 64 between a retracted position as indicated by the solid lines of fork 64 and an extended position indicated by the dashed line 64'. Carrier 62 is operated by drive means 68 between a top fork level position indicated by dashed line TL and bottom fork level position indicated by dashed line BL. Fork 64 includes individual tines 64a that are spaced such that they extend between vertical rear wall channels 70 of carts 72. Carts 72 are preferably of the type seen in copending application Ser. No. 08/552,834, now U.S. Pat. No. 5,873,204 which application is incorporated herein by reference thereto. It will be understood by those of skill that rear wall channels 70 extend in a manner unimpeded by horizontal cross bracing or the like from the cart base 74 to a top channel rail 76. Base 74 includes four caster wheel 77 for providing easy portability of cart 72. As a result of no cross bracing, the individual tine 64a can be inserted between channels 70 into the interior of cart 72 and moved continuously from a position adjacent base 74 to rail 76 without being blocked in any fashion.

Cart loading station 14 includes a framework 80 defining an empty cart receiving area 82 and a cart loading area 84. The present invention includes cart moving means 85 for moving an empty cart 72 from receiving area 82 to loading area 84. Such moving means can be understood by referring to FIGS. 15 and 16. As seen therein a power cylinder 90 includes a cart contacting head 92. Head 92 includes a cylinder 94 connected to a dog 95 for operation between an extended cart contacting position, as seen by the solid lines thereof and a retracted position as indicated by dashed lines 95'. Head 92 is extendible and retractable by cylinder 90. As is understood by those in the art, a tube 96 and segmented carrier 98 provide for the orderly and protected movement of the pneumatic lines 100 that power cylinder 94 as head 92 is extended and retracted. Thus, it can be understood that a moving means 85 is situated in the loading area 84 adjacent the bottom thereof and oriented so that the head 92 thereof is extendible therefrom into receiving area 82. A track in-feed guide 102 serves to contact a wheel 77 of a cart 72 to effect proper positioning thereof in area 82 as a cart 72 is pushed therein. A further cart receiving track 104 on the floor of area 82 is slightly v-shaped and concave. Track 104 retains two corresponding wheels 77 and of a cart 72 and serves to guide such cart latterally into area 84 when moved therein.

The present invention includes a PC user interface 110 for control thereof which comprises an input device such as a keyboard 110' and a monitor 110b. A control panel 112 includes the microprocessor other control apparatus and switches for the operation of the present invention. In addition, as will be understood by those of skill, the present invention uses a variety of mechanical, electronic and photo sensors for sensing the positions of the various bundles, clamps, pushers and carts, as well as the positions of the fork 64 and its carrier 62. Such sensing is well known in the art as well as is the manner in which such sensing information is used to control the basic operation of these various components. Furthermore, The present invention uses a plurality of pneumatic valves, pressurized lines and so forth for operating of the various cylinders herein. All such basic sensing, controlling and pneumatic hardware and its construction, operation and manner of use are well known in the art. Therefore the description thereof is not included herein in order to facilitate a clear understanding and explanation of the present invention.

A seen by referring to FIGS. 1 and 2, Loader 10 also includes two operator ladders 116 and 118 providing access to two corresponding operator platform areas 120 and 122. As seen by also referring to FIG. 23, the present invention uses an operator training gate system. That system employs five photo eye detectors 124, 126, 128, 130 and 132 and corresponding beam reflectors 124a, 126a, 128a, 130a, and 132a. Photo eyes 124, 126, 128, 130, 132 and reflectors 124a, 126a, 128a, 130a, 132aprovide for the generation and reflection of corresponding light beams 124b, 126b, 128b, 130b and 132b respectively. A pair of cart proximity sensors 134 and 136 are located adjacent receiving area 82 and loading area 84 respectively. Three emergency stop switches 138, 140 and 142 are secured to various locations on loader 10.

The operation of cart loading station 14 can be understood wherein cart moving means 85 is operated wherein the cylinder head 92 is extended into receiving area 82 while at the same time cylinder 94 is operated to move dog 95 into its retracted position 95'. In this manner dog 95 can be moved underneath and does not contact the base 74 of a cart 72 present in receiving area 82. Cylinder 94 is then operated to extend dog 95 so that it can hook onto a cross member of base 74. Cylinder 90 thereof is then retracted pulling cart 72 into the loading area 84.

Conveyor 22 operates to move bundles B towards clamps 24 and 26 and end pusher 38. The first two bundles B1 and B2 are allowed to enter first bundle position area 30. The third bundle B3 is detected by a sensing means that signals clamp 26 to extend and clamp it against plate 28. In this manner the third bundle is prevented from entering area 30. In a similar manner a fourth bundle B4 can be stopped by clamp 24 or simply be stopped by facing up against the second bundle. Clamp 24 can permit a further regulation of bundles into position 30 wherein only one bundle is sent therein if clamp 24 remains extended against a bundle. Thus an odd pattern of three bundles could be formed if a lesser number of bundles are required in a particular cart. Prior to bundles one and two entering area 30, end pusher 38 was extended. With bundles one and two in area 30, pusher 30 is retracted thereby creating a greater separation between bundles two and three. With carrier 40 in its retracted position, pusher 32 is extended and bundles one and two are loaded thereon into a pattern forming area PF. It can be appreciated that the increased separation between bundles two and three serves to insure that there is no contact there between during the operation of pusher 32 that could cause tearing thereof. Clamps 24 and 26 are then retracted and pusher 38 extended whereby bundles three and four are then permitted to enter area 30. Bundles three and four are also then loaded onto carrier wherein it can be understood that bundles 1 and 2 are contacted thereby and pushed towards the opposite end of carrier 40. Thus, a pattern of four bundles is now formed on carrier 40 in pattern forming area PF. When further fifth and sixth bundles B5 and B6 are in position in area 30 pusher 32 can load them onto carrier 40 while carrier is moved to its extended position. Bundles 1–4 are now positioned in area 84 directly above an empty cart 72. Fork apparatus 20 has previously been operated so that fork 64 is extended and is at its top position. Wiper mechanism 46 is then operated wherein cylinders 48 are extended so that bottom surface portion 50c is first forced against roller 56 and travels there along until rollers 56 are in contact with bottom portions 50b. As this occurs, it can be understood that tines 50 are forced upward and are then inserted through slots 45 so that stop ends 50a extend above the surface of carrier 40. Carrier 40 is then retracted whereby bundles 3 and 4 contact surfaces 50a so that bundles 1–4 do not move back with carrier 40 but are stripped therefrom and fall a small distance onto fork 64. As carrier 44 is retracted further seventh and eighths bundles B7 and B8 can be loaded thereon. Alternatively, bundles may in some cases be loaded into the patter forming area PF prior to retraction of sheet 40. In this case it will be appreciated that the second pattern consisting of bundles 5–8 will contact a stop S and be pushed along carrier 40 to the leading end 43' thereof. Wiper mechanism 46 is previously retracted to the position as seen in FIG. 13 wherein tines 50 are permitted to fall along surface 50c so that rollers 56 are retained in notch areas 50d. The retraction of tines 50 is needed to permit the movement of further bundles onto the leading end 43 of carrier 40.

After receiving the first layer of bundles thereon, fork 64 is lowered a distance generally equal to the height of the bundle layer. In this manner, a further layer of bundles can be deposited on the first layer in the manner as above described. This process is repeated until the cart 72 is fully loaded and fork 64 rests directly adjacent base 74 thereof. Fork 64 is then retracted from cart 72 and a cart moving means, not shown, is operated to push the fully loaded cart 72 from the loading area 84 so that a further empty cart 72 can be received therein.

It can be appreciated by those of skill that while bundles are coming into area 30 and being placed in pattern forming area PF, bundles of the previously formed pattern are being deposited in a cart 72. Thus, the above described loading process has the advantage of providing for an overlap of those functions and therefore a time saving with respect to the performance thereof. It can also be understood that the predetermined pattern can be formed on the carrier 40 whether it is in its extended or retracted position, i.e. whether or not the leading end 33' or trailing end 33" receives the pattern. Thus, loader 10 provides for great operational flexibility in this regard.

A modified loading process from the one above described is used where the bundles are more rounded, and as a result thereof, more difficult to handle and more susceptible to tearing. In this process, through user interface 110, a maximum number of layers is selected to be loaded onto fork 64 before it will be required to move downward and deposit such layers in a cart 72. Thus, for example, if two layers are selected, then the above described process will continue until a first two layers of bundles rest on fork 64. Fork 64 will then be moved down to the base 74 of the cart 72 after which fork 64 will be retracted therefrom depositing the first two bundle layers thereon. The fork 64 will then be moved back to its top position and re-inserted into the cart 72 so that it can again receive two bundle layers thereon. Fork 64 will then move down but to a position immediately above the previously deposited two layers. Again, fork 64 will be retracted, depositing the further two bundle layers and move upward to receive yet a further two layers. This re-forking process is then repeated until the cart 72 is full. It can be understood that this re-forking approach can require an interruption in the stripping step of removing a bundle pattern from carrier 40 in order to allow for the additional movement of fork 64. In addition, any number of layers can be selected as the predetermined maximum depending upon the characteristics of the particular bundles. It can be appreciated that this re-forking strategy provides a means for loading bundles that can be, by virtue of their shape, difficult to stack and handle in an orderly manner and prone to tearing.

It can further be appreciated that wiping mechanism 46 provides an advantage over a more traditional blocking plate mechanism that would overhang carrier 40 and extend a plate downward to block the bundles as carrier 40 is retracted. By its positioning beneath carrier 40 the area above carrier 40 is unobstructed thereby permitting easier operator access to that area. Thus, the operator can more easily remove a misaligned bundle, or access that part of loader 10 to effect any repairs and more easily visually ascertain if a problem has occurred therein. It can also be seen that stairways 116 and 118 along with platforms 120 and 122 serve to further facilitate access to loader 10. Wiping mechanism 46 essentially needs a surface on which a slideable contact means such as rollers 56 can move and contact so that the geometry of tines 50 permits there raising and lowering with respect thereto as cylinders 48 extend and retract.

It will be understood that access to a moving part of loader first requires a shutdown thereof by the operation of one of the stops 138, 140, 142. Loader 10 includes an operator training gate system whereby if any of the beams 124b, 126b, 128b, 130b, 132b, which pass along the accessible moving parts of loader 10, are broken, without first shutting off loader 10 by actuating one of the switches 138, 140, 142, restarting of loader 10 will require an input at the user interface through, for example, keyboard 110' followed by a manual switching of one of the stop switches 138, 140, 142. Had the operator operated one of the switches 130–142 first, re-start would be accomplished simply by returning to the switch 138, 140, 142 and operating it to again run loader 10. Thus, it can be appreciated that this system serves to train the operator to use one of the emergency switches 138, 140, 142 first rather than have to take extra steps to re-start loader 10. Typically user interface 110 is located at a position not convenient to any of the switches 138, 140, 142.

Photoeyes 130 and 132 extend individual beams 130b and 132b across the entrance and exit respectively of areas 82 and 84. These photo sensors work independently whereby breaking of corresponding beams 130b or 132b can result in machine shutdown. However, such a shutdown will not occur if, for example, beam 130b is broken and proximity sensor 134 senses that a cart 72 is also simultaneously present and adjacent thereto. The same holds true with respect to coordination and operation of beam 132b and sensor 136. It can be appreciated that the presence of a cart 72 is indicative of normal operation, therefore loader 10 is not shutdown. Thus, if only an operator breaks beams 130b or 132b, with no cart 72 being present to satisfy sensors 134 or 136 respectively, then a shut down occurs. In the specific case of area 82, a delay is programmed with respect to triggering a shutdown. For example, if the operator pushes a cart into area 82 a breaking of beam 130b as the operator walks away from area 82, within the delay period, for example set at one second, will not result in a shutdown. This approach permits for normal operation of loader 10 without triggering needless shutdowns.

Figure 23:
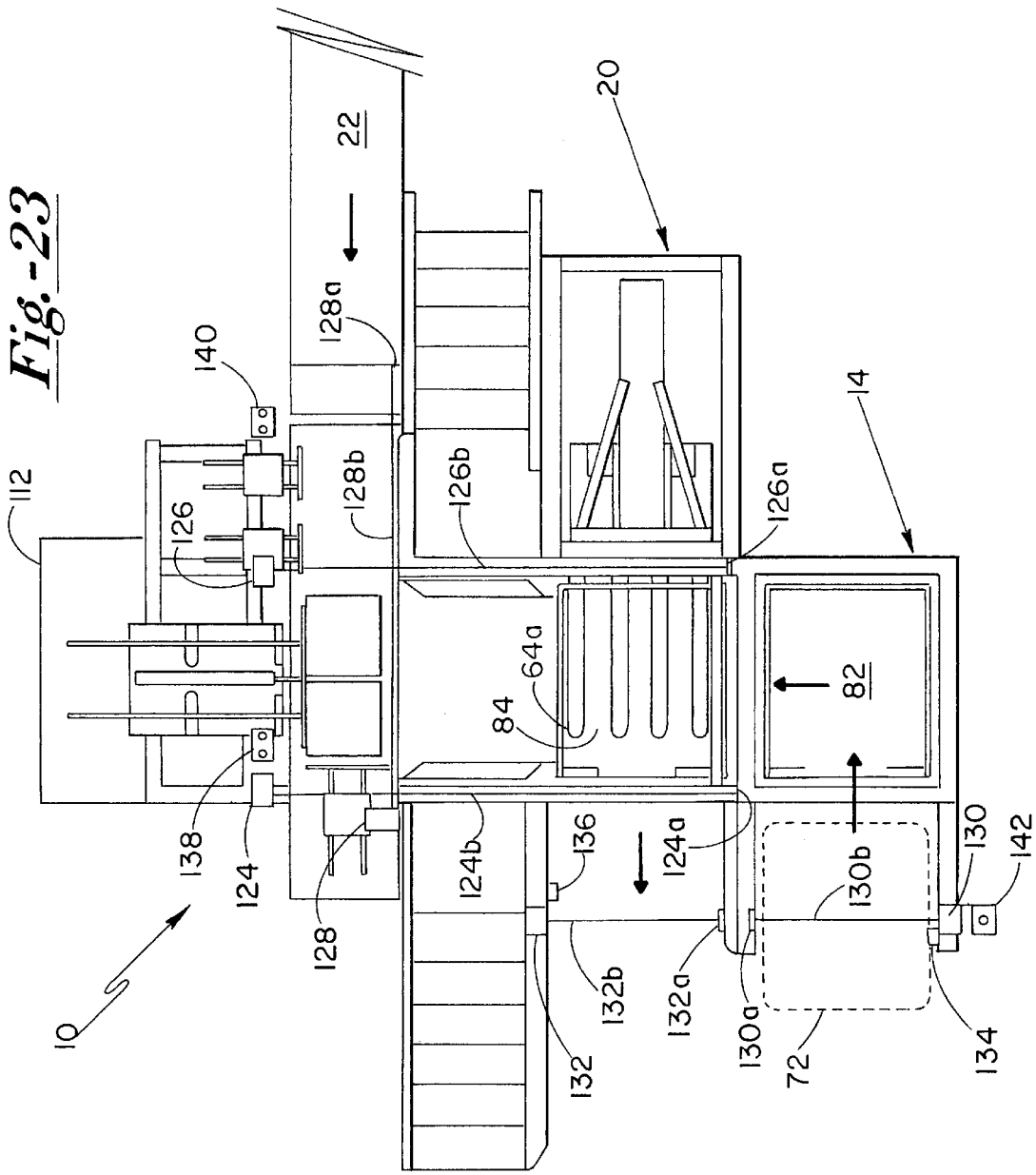
FIG. 23 shows a top plan schematic view of the present invention.

As seen in FIG. 23, a further ability of the present invention concerns the handling of the carts 72 wherein a cart 72 can be placed into area 82, moved to area 84 and then removed therefrom in a U-shaped pattern as indicated by the arrows. Thus, the carts 72 can be moved into and out of loader 10 on a same side and end thereof. This ability is in contrast to other cart loading machines that require the loaded cart to exit from an opposite side or structural portion thereof, i.e. there exists some physical structure between the empty carts and the loaded carts. In most cases it can be more convenient to move the empty and loaded carts, either manually or through an automated cart conveyance system, to the loader and away therefrom after loading, from the same general location, without having an obstruction to deal with. Moreover, the U-shaped path the carts take to, through and away from loader 10 is conducive to efficient manual or automated cart handling in terms of overall system cost, size and ease of operation. Also, the general layout and specific structure of loader 10 that permits this same side cart handling allows for flexibility in system design with respect to various customer facilities and product flow requirements.

It will be appreciated by those of skill that various modification can be made to the present invention and remain within the intended scope thereof. For example, various patterns could be formed having different numbers of bundles or objects. Also, the present invention utilizes various pneumatically driven cylinders, whereas other types of linear drive means could be utilized.

We claim:

1. A cart loader for loading objects onto a cart, comprising:
   an object loading mechanism including an arranging apparatus for arranging one or more of the objects into a pattern and including a layering apparatus for loading one or more layers of said patterns onto a cart,
   a cart loading station adjacent the object loading mechanism and defining a cart intake area and a cart loading area directly adjacent each other for receiving an empty cart in the cart intake area and subsequently moving the empty cart laterally into the cart loading area for loading thereof, and the receiving of an empty cart into the cart intake area and removal of a loaded cart from the cart loading area taking place on a first side of the cart loading station wherein the movement of a cart into the intake area and out of the loading area occurs along pathways that are adjacent each other so that both loaded and unloaded carts can be handled from said first side without obstruction from the object loading mechanism.

2. The cart loader as defined in claim 1, and the arranging apparatus including a clamp mechanism extendable in a direction transverse to the direction of travel of a delivery conveyor, the delivery conveyor for moving a plurality of the objects to the cart loader in a single file line, the clamp mechanism for regulating movement of the objects into an object arranging area.

3. The cart loader as defined in claim 1, and the arranging apparatus including a clamp mechanism operable to extend and retract in a direction coextensive with the direction of travel of a delivery conveyor, the delivery conveyor for moving a plurality of the objects to the cart loader in a single file line, the clamp mechanism for creating a separation space between a pair of objects located in an arranging area.

4. The cart loader as defined in claim 1, and the arranging apparatus including a first clamp and a second clamp extendable in a direction transverse to the direction of travel of a delivery conveyor, the delivery conveyor for moving a plurality of the objects to the cart loader in a single file line, the first and second clamps for regulating movement of the objects into an object arranging area.

5. The cart loader as defined in claim 4, and the arranging apparatus including a third clamp operable to extend and retract in a direction coextensive with the direction of travel of the delivery conveyor for creating a separation space between a pair of objects located in the arranging area.

6. The cart loader as defined in claim 1, and the cart loading station further including cart moving apparatus for automatically moving a cart from the cart intake area to the cart loading area.

7. The cart loader as defined in claim 6, and the moving apparatus including an arm positioned in the cart loading station for extending below a cart located in the cart intake area for releasably cooperating with a base portion of the cart so that retracting of the arm pulls the cart into the cart loading area and extension of the arm causes release thereof with the cart base portion.

8. The cart loader as defined in claim 1, and including a carrier for moving the arranged pattern of objects from an arranging area to the cart loading area and the carrier including a wiping mechanism having a stop tine secured to a drive mechanism for moving the tine between a retracted position below a top surface of the carrier to an extended position above the top surface of the carrier, and the carrier including a slot in the top surface thereof to permit travel of the carrier when the stop tine is in the extended position so that the pattern of one or more objects on the carrier can be contacted by the stop tine and wiped off the carrier during movement thereof from the cart loading area to the arranging area.

9. The cart loader as defined in claim 8, and the wiping mechanism including a plurality of stop tines and the carrier including a corresponding plurality of stop tine slots.

10. The cart loader as defined in claim 1, and the layering apparatus having an article receiving surface extending substantially horizontally and moveable between an extended position above a base of a cart located in the cart loading area and a retracted position not above the base of a cart located in the cart loading area, and the article receiving surface also movable vertically between a top position at a height closely adjacent a bottom surface of the carrier and bottom position closely adjacent the cart base so that one or more objects as arranged as a pattern on the carrier can be moved by the wiping mechanism onto the article receiving surface and be sequentially lowered towards the cart base and stacked thereon as layers thereof on the cart base.

11. The cart loader as defined in claim 1, and the layering apparatus positioned on a second side of the cart loading station opposite from the first side thereof.

12. A cart loader for loading objects onto a cart, comprising:
an object loading mechanism including arranging apparatus for arranging one or more of the objects in predetermined patterns and a layering apparatus for loading one or more layers of said patterns into a cart,
a cart loading station adjacent the object loading mechanism and defining a cart intake area and a cart loading area directly adjacent each other for receiving an empty cart in the cart intake area and subsequently moving the empty cart laterally into the cart loading area for loading thereof, and the receiving of an empty cart into the cart intake area and removal of a loaded cart from the cart loading area describing a U-shaped pattern and taking place on a first side of the cart loading station,
and the layering apparatus adjacent the cart loading area.

13. The cart loader as defined in claim 12, and the layering apparatus positioned on a second side of the cart loading station opposite from the first side thereof.

14. The cart loader as defined in claim 12, and the arranging apparatus including a clamp mechanism extendable in a direction transverse to the direction of travel of a delivery conveyor, the delivery conveyor for moving a plurality of the objects to the cart loader in a single file line, the clamp mechanism for regulating movement of the objects into an object arranging area.

15. The cart loader as defined in claim 12, and the arranging apparatus including a clamp mechanism operable to extend and retract in a direction coextensive with the direction of travel of a delivery conveyor, the delivery conveyor for moving a plurality of the objects to the cart loader in a single file line, the clamp mechanism for creating a separation space between a pair of objects located in an arranging area.

16. The cart loader as defined in claim 12, and the arranging apparatus including a first clamp and a second clamp extendable in a direction transverse to the direction of travel of a delivery conveyor, the delivery conveyor for moving a plurality of the objects to the cart loader in a single file line, the first and second clamps for regulating movement of the objects into an object arranging area.

17. The cart loader as defined in claim 16, and the arranging apparatus including a third clamp operable to extend and retract in a direction coextensive with the direction of travel of the delivery conveyor for creating a separation space between a pair of objects located in the arranging area.

18. The cart loader as defined in claim 12, and the cart loading station further including cart moving apparatus for automatically moving a cart from the cart intake area to the cart loading area.

19. The cart loader as defined in claim 18, and the moving apparatus including an arm positioned in the cart loading station for extending below a cart located in the cart intake area for releasably cooperating with a base portion of the cart so that retracting of the arm pulls the cart into the cart loading area and extension of the arm causes release thereof with the cart base portion.

20. The cart loader as defined in claim 12, and including a carrier for moving the arranged pattern of objects from an arranging area to the cart loading area and the carrier including a wiping mechanism having a stop tine secured to a drive mechanism for moving the tine between a retracted position below a top surface of the carrier to an extended position above the top surface of the carrier, and the carrier including a slot in the top surface thereof to permit travel of the carrier when the stop tine is in the extended position so that the pattern of one or more objects on the carrier can be contacted by the stop tine and wiped off the carrier during movement thereof from the cart loading area to the arranging area.

21. The cart loader as defined in claim 20, and the wiping mechanism including a plurality of stop tines and the carrier including a corresponding plurality of stop tine slots.

22. A cart loader for loading objects onto a cart, comprising:

an object loading mechanism including arranging apparatus for arranging one or more of the objects in predetermined patterns and a layering apparatus for loading one or more layers of said patterns into a cart, a cart loading station adjacent the object loading mechanism and defining a cart intake area and a cart loading area directly adjacent each other for receiving an empty cart in the cart intake area and subsequently moving the empty cart laterally into the cart loading area for loading thereof, and the receiving of an empty cart into the cart intake area and removal of a loaded cart from the cart loading area describing a U-shaped cart travel pattern and taking place on a first side of the cart loading station so that loaded and unloaded carts can be handled from said first side without obstruction from the object loading mechanism, a carrier apparatus for moving the predetermined pattern of objects from the arranging area to the cart loading area.

23. The cart loader as defined in claim 22, and the layering apparatus positioned on a second side of the cart loading station opposite from the first side thereof.

24. The cart loader as defined in claim 23, and the arranging apparatus including a first clamp mechanism extendable in a direction transverse to the direction of travel of a delivery conveyor, the delivery conveyor for moving a plurality of the objects to the cart loader in a single file line, the clamp mechanism for regulating movement of the objects into an object arranging area.

25. The cart loader as defined in claim 24, and the arranging apparatus including a second clamp mechanism operable to extend and retract in a direction coextensive with the direction of travel of a delivery conveyor, the clamp mechanism for creating a separation space between a pair of objects located in the arranging area.

26. The cart loader as defined in claim 22, and the arranging apparatus including a first clamp and a second clamp extendable in a direction transverse to the direction of travel of a delivery conveyor, the delivery conveyor for moving a plurality of the objects to the cart loader in a single file line, the first and second clamps for regulating movement of the objects into the object arranging area.

27. The cart loader as defined in claim 26, and the arranging apparatus including a third clamp operable to extend and retract in a direction coextensive with the direction of travel of the delivery conveyor for creating a separation space between a pair of objects located in the arranging area.

28. The cart loader as defined in claim 25, and the cart loading station further including cart moving apparatus for automatically moving a cart from the cart intake area to the cart loading area.

29. The cart loader as defined in claim 28, and the moving apparatus including an arm positioned in the cart loading station for extending below a cart located in the cart intake area for releasably cooperating with a base portion of the cart so that retracting of the arm pulls the cart into the cart loading area and extension of the arm causes release thereof with the cart base portion.

30. The cart loader as defined in claim 22, and the carrier including a wiping mechanism having a stop tine secured to a drive mechanism for moving the tine between a retracted position below a top surface of the carrier to an extended position above the top surface of the carrier, and the carrier including a slot in the top surface thereof to permit travel of the carrier when the stop tine is in the extended position so that the pattern of one or more objects on the carrier can be contacted by the stop tine and wiped off the carrier during movement thereof from the cart loading area to the arranging area.

31. The cart loader as defined in claim 30, and the wiping mechanism including a plurality of stop tines and the carrier including a corresponding plurality of stop tine slots.

* * * * *